(12) United States Patent
Ling et al.

(10) Patent No.: US 11,492,546 B2
(45) Date of Patent: Nov. 8, 2022

(54) 2D ELECTROCHROMIC METAL-ORGANIC-FRAMEWORKS

(71) Applicant: TRUSTEES OF BOSTON UNIVERSITY, Boston, MA (US)

(72) Inventors: Xi Ling, Brookline, MA (US); Ran Li, Malden, MA (US); Lu Ping, Allston, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 17/078,450

(22) Filed: Oct. 23, 2020

(65) Prior Publication Data

US 2021/0122775 A1 Apr. 29, 2021

Related U.S. Application Data

(60) Provisional application No. 62/925,436, filed on Oct. 24, 2019.

(51) Int. Cl.
| | |
|---|---|
| *C07F 15/04* | (2006.01) |
| *C01G 53/04* | (2006.01) |
| *G02F 1/1333* | (2006.01) |
| *G02F 1/1343* | (2006.01) |
| *C09K 9/00* | (2006.01) |
| *C07F 15/00* | (2006.01) |

(Continued)

(52) U.S. Cl.
CPC .............. *C09K 9/00* (2013.01); *C01G 53/04* (2013.01); *C07F 15/00* (2013.01); *C07F 15/045* (2013.01); *G02F 1/13439* (2013.01); *G02F 1/133305* (2013.01); *G02F 1/1514* (2019.01); *C09K 2211/1025* (2013.01); *C09K 2211/1441* (2013.01); *C09K 2211/18* (2013.01); *C09K 2211/183* (2013.01); *C09K 2211/185* (2013.01); *C09K 2211/187* (2013.01); *G02F 1/1357* (2021.01); *G02F 1/15* (2013.01); *G02F 1/155* (2013.01); *G02F 2001/15025* (2019.01)

(58) Field of Classification Search
CPC ....... C07F 15/045; C01G 53/04; G02F 1/155; G02F 1/13439; G02F 1/133305
See application file for complete search history.

(56) References Cited

U.S. PATENT DOCUMENTS

| | | |
|---|---|---|
| 2008/0299369 A1 | 12/2008 | Adachi et al. |
| 2014/0093778 A1 | 4/2014 | Askit et al. |

(Continued)

OTHER PUBLICATIONS

Casey R. Wade, Minyuan Li, and Mircea Dinca, Facile Deposition of Multicolored Electrochromic Metal-Organic Framework Thin Films, Angew. Chem. Int. Ed. 2013, 52, 13377-13381 (Year: 2013).*

(Continued)

*Primary Examiner* — Bijan Ahvazi
(74) *Attorney, Agent, or Firm* — Nixon Peabody LLP; Ronald I. Eisenstein; Ravinderjit S. Braich

(57) ABSTRACT

Herein are described two-dimensional metal organic frameworks (2D MOFs). The 2D MOFs includes a plurality of multivalent metals or metal ions and a plurality of multidentate ligands arranged to form a crystalline structure having a lateral size of at least about 2.5 μm and a thickness of less than about 5 nm. Herein are also described methods for preparing the 2D MOFs. The 2D MOFs can be used, for example, in electrochromic devices such as smart windows and flexible displays.

29 Claims, 17 Drawing Sheets

(51) Int. Cl.
  G02F 1/1514    (2019.01)
  G02F 1/155     (2006.01)
  G02F 1/15      (2019.01)
  G02F 1/135     (2006.01)

(56) References Cited

U.S. PATENT DOCUMENTS

2018/0274013 A1* 9/2018 Zhang ............... C12Q 1/6825
2019/0276476 A1* 9/2019 Shan ..................... C07F 1/08

OTHER PUBLICATIONS

Alexandre Abherve, Samuel Manas-Valero, Miguel Clemente-Leon and Eugenio Coronado, Graphene related magnetic materials: micromechanical exfoliation of 2D layered magnets based on bimetallic anilate complexes with inserted [FeIII(acac2-trien)]+ and [FeIII(sal2-trien)]+, Chem. Sci., 2015, 6, 4665-4673 (Year: 2015).*
Jin-Hu Dou, and Mircea Dincă, Atomically precise single-crystal structures of electrically conducting 2D metal-organic frameworks, Nature Materials | vol. 20 | Feb. 2021 | 222-228 (Year: 2021).*
Abbasi, "Metal-organic frameworks of cobalt and nickel centers with carboxylate and pyridine functionality linkers: Thermal and physical properties; precursors for metal oxide nanoparticel preparation", Journal of Nanostructures, 2, 379-388, (2012).
AlKaabi et al., "Transparent-to-Dark Electrochemical Behavior in Naphthalene-Diimide-Based Mesoporous MOF-74 Analogs", Chem., 1, (2.), 264-272, (2016).
Chaudhari et al., "Electrochromic thin films of Zn-based MOF-74 nanocrystals facilely grown on flexible conducting substrates at room temperature", APL Materials, 7, 1-7, (2019).
Fu et al., "A viologen-based multifunctional Eu-MOF: photo/electro-modulated chromism and luminescence", ChemComm, 1-5, (2020).
Furukawa et al., "Greater Porosity with Redox Reaction Speeds Up MOF Color Change", Chem., 1, 184-196, (2016).
Kumar et al., "AFM Studies on surface morphology, topography and texture of nanostructured zinc aluminum oxide thin films", Digest Journal of Nanomaterials and Biostructures, 7, (4.), 1881-1889, (2012).
Kung et al., "Metal-Organic Framework Thin Films Composed of Free-Standing Acicular Nanorods Exhibiting Reversible Electrochromism", Chemistry of Materials, 25, 5012-5017, (2013).
Li et al., "Ion-Transport Design for High-Performance Na+-Based Electrochromics", ACS Nano, 12, 3759-3768, (2018).
Liu et al., "Highly Stable and Rapid Switching Electrochromic Thin Films Based on Metal-Organic Frameworks with Redox-Active Triphenylamine Ligands", ACS Applied Materials & Interfaces, 12, 7442-7450, (2020).
Mjejri et al., Double-Sided Electrochromic Device Based on Metal-Organic Frameworks, ACS Applied Materials & Interfaces, 9, 39930-39934, (2017).
Wade et al., "Facile Deposition of Multicolored Electrochromic Metal-Organic Framework Thin Films", Angewandte Chemie, 52, 13377-13381, (2013).
Wang et al., "Reversed thermo-switchable molecular sieving membranes composed of two-dimensional metal-organic nanosheets for gas separation", Nature Communications, 8, 1-26, (2017).
XiaoZhou et al., "Recent advances in fabrication of monolayer colloidal crystals and their inverse replicas", Chemistry Science China, 57, 58-69, (2014).
Xie et al., "A Naphthalenediimide-Based Metal-Organic Framework and Thin Film Exhibiting Photochromic and Electrochromic Properties", Inorganic Chemistry, 55, 549-551, (2016).
Zhang et al., "Fabrication of Large-Area Two-Dimensional Colloidal Crystals", Angewandte Chemie, 51, 6117-6120, (2012).
Zhang et al., "Visible-light harvesting pyrene-based MOFs as efficent ROS generators", Chemical Science, 10, 8455-8460, (2019).
Zhou et al., "Two-dimensional metal-organic framework nanosheets: Synthesis and applications", Chem. Soc. Rev., 1-30, (2018).
Indium Doped Tin Oxide (in-Sno2 or ITO) coated glass. Datasheet [online]. MSA Supplies, [retrieved on Dec. 15, 2020]. Retrieved from the Internet: <URL: https://www.msesupplies.com/products/ito-glass-substrate-3-5-ohm-sq-indium-doped-tin-oxide-in-sno2-or-ito-coated-glass-can-customize-conductive-film-patterns-as-required?variant=33749136271>.

* cited by examiner

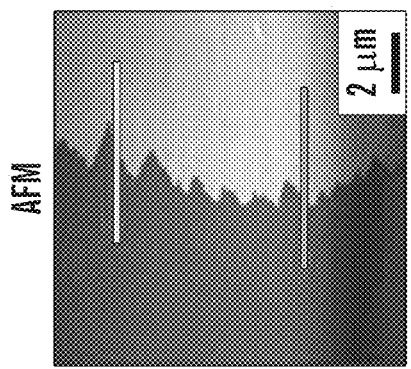
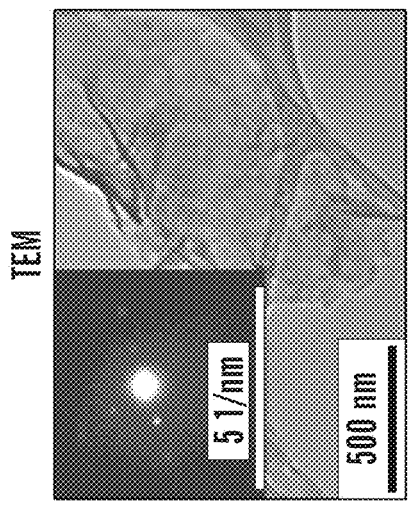
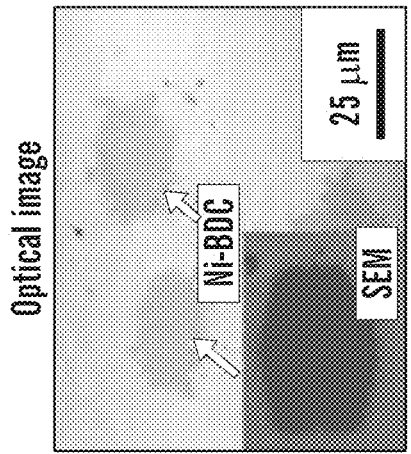
FIG. 3A    FIG. 3B    FIG. 3C
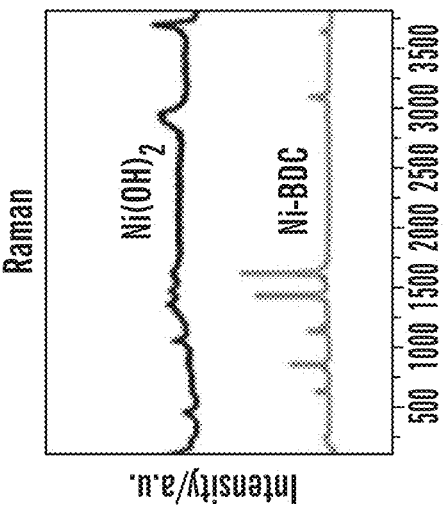
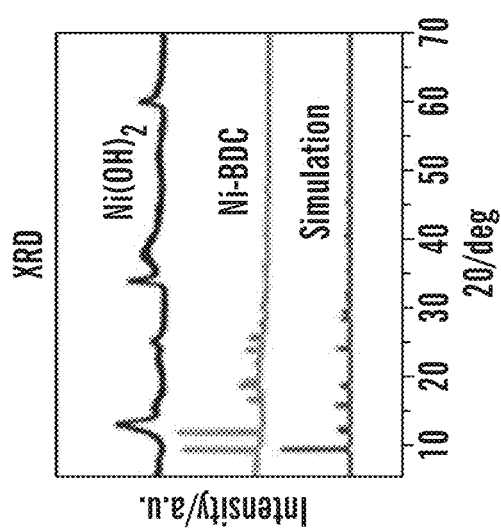
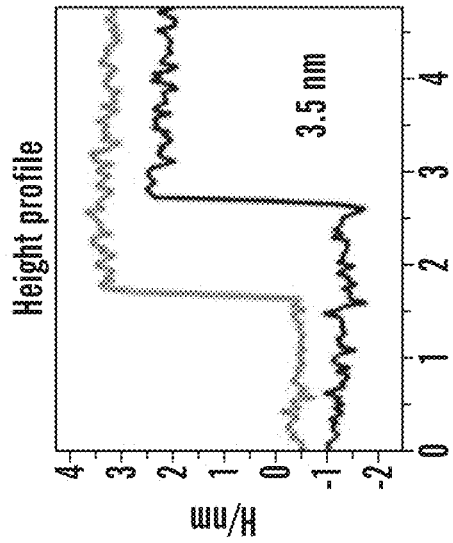
FIG. 3D    FIG. 3E    FIG. 3F

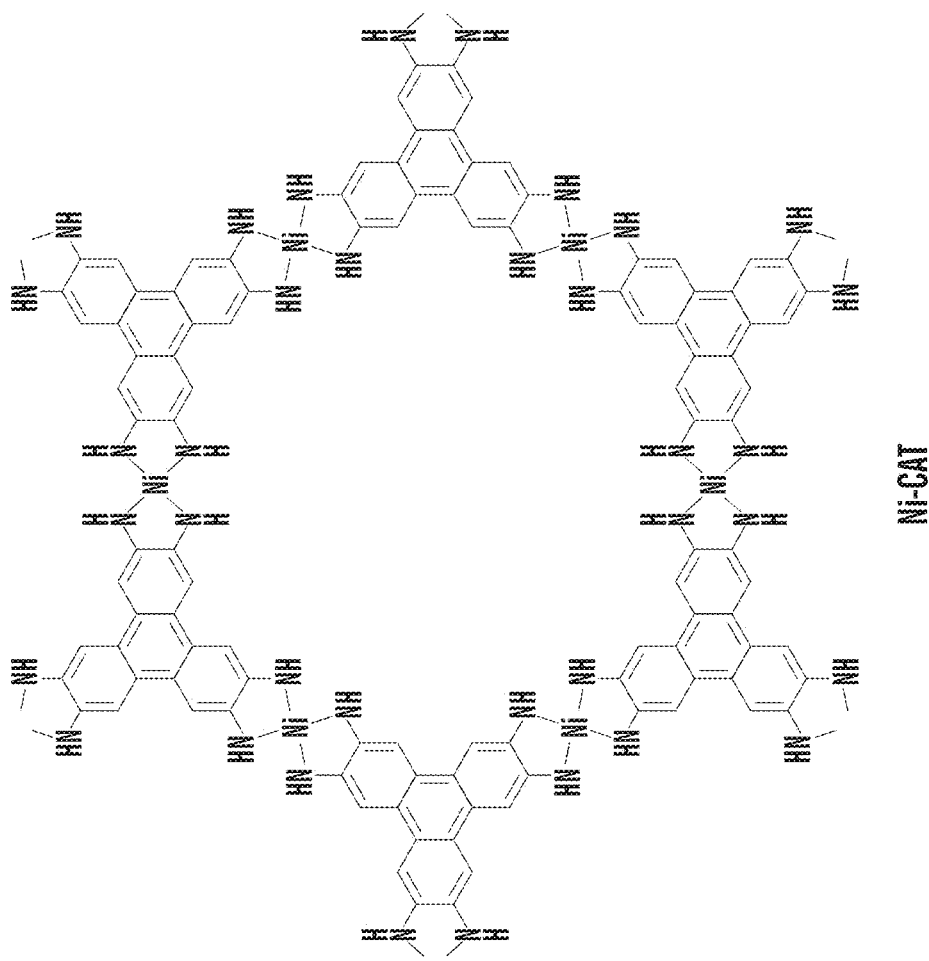
FIG. 8A Ni-CAT
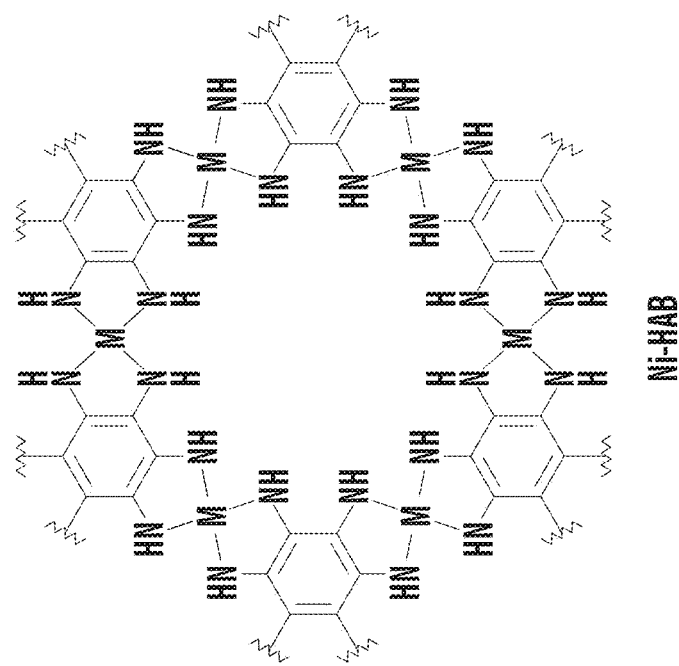
FIG. 8B Ni-HAB

Dipyrimidinedisulfide (pym$_2$S$_2$)

Tetrakis (4-carboxyphenyl) porphyrin (TCPP)

Hexaaminobenzene (HAB)

2,5-Dihydroxy-3, 6-dichloro-1, 4-benzoquinone (H$_2$C$_6$O$_4$Cl$_2$)
2,5-Dihydroxy-3, 6-dibromo-1, 4-benzoquinone (H$_2$C$_6$O$_4$Br$_2$)
X = Cl, Br Benzenehexathiol (BHT)

Triphenylenehexathiol (THT)
Triphenylenehexamine (THA)
R = SH, NH$_2$

2D ELECTROCHROMIC METAL-ORGANIC-FRAMEWORKS

RELATED APPLICATIONS

This application claims benefit under 35 U.S.C. § 119(e) of the U.S. Provisional Application No. 62/925,436 filed Oct. 24, 2019, the content of which is incorporated herein by reference in its entirety.

FIELD OF THE INVENTION

This invention relates to 2D electrochromic metal-organic-frameworks (MOFs). More particularly, the invention is directed to MOFs, their preparation and uses in electrochromic devices.

BACKGROUND

Metal-organic frameworks (MOFs) are crystalline materials with periodic structural pores, where inorganic metal centers are connected by organic ligands through coordination bonds. The diversified composition of MOFs provides them tailorable properties through the change of metal center and organic ligand. [O. M. Yaghi., H. Li, *J. Am. Chem. Soc*, 1995, 117, 10401; O. M. Yaghi., G. Li, H Li, *Nature*, 1995, 378, 703; H. Li, M. Eddaoudi, *Nature*, 1999, 402, 276; W. Xuan, C. Zhu, Liu Y, *Chem. Soc. Rev.,* 2012, 41, 1677.]

Being an inorganic and organic hybrid material, MOFs possess both excellent stability and color tunability for potential full-color reflective devices. A group at MIT has pioneered in this field. [C. R. Wade, M. Li, M. Dincă, *Angew. Chem., Int. Edit.,* 2013, 52, 13377] where they initially obtained zinc-pyrazolate naphthalene diimide MOF using solvothermal reaction and demonstrated the Electro Chromic (EC) response of the MOF. The group further obtained two more EC MOF films with different chromophore effects by changing the functional groups on the organic ligand. A different group at Northwestern University deposited a perpendicularly aligned needle-like pyrene-based MOFs film on a conductive fluorine-doped tin oxide (FTO) glass for EC device. [C. W. Kung, T. C. Wang, J. E. Mondloch, *Chem. Mater.,* 2013, 25, 5012]

The performance of the few reported MOF-based EC device is still far from enough for flexible reflective display applications, as the colors of the studied MOFs are less tunable and unevenly distributed. Another issue is that brittleness nature of 3D MOF crystals and the limitation of large area film-forming technology lead to the unbendable fragile films and nonuniform insertion of the ions into the MOFs, making the EC devices unsatisfied for flexible reflective displays.

Therefore, an effective method to synthesize thin-film-transistor (TFT) technology qualified MOFs is highly desirable and unmet need in this field. The present disclosure is directed to solving these and other problems.

SUMMARY

In general, the inventions described herein relate to two-dimensional metal organic framework compounds (2D MOF), their preparation and uses. The compounds described herein can be used as components in electrochromic devices, such as smart windows and flexible display devices.

A first implementation of the disclosure is a two-dimensional metal organic framework (2D MOF). The 2D MOF includes a plurality of multivalent metals or metal ions and a plurality of multidentate ligands. The plurality of multivalent metals or metal ions and the plurality of multidentate ligands are arranged to form a crystalline structure. The 2D MOF is very thin and has a high aspect ratio. For example, 2D MOF has a lateral size of at least 5 µm and a thickness about 5 nm or lower. Optionally, the 2D MOF forms as a single crystal.

A second implementation of the disclosure is a method for preparing a metal oxide nanosheet. The method includes mixing a metal containing precursor with a surfactant at a high temperature for a period of time. The produced metal oxide nanosheet has a lateral size of at least 5 µm and a thickness about 5 nm or lower.

A third implementation of the disclosure is a method of preparing a 2D MOF. The method includes reacting a metal oxide compound suspended in a liquid with a multidentate ligand dissolved in the liquid. The reaction occurs while at least a portion of the metal oxide compound is not dissolved in the liquid, and the product 2D MOF is at least partially insoluble in the liquid.

A fourth implementation of the disclosures is a substrate including, at least on a part of a surface of the substrate, a 2D MOF. The 2D MOF includes a plurality of multivalent metals or metal ions and a plurality of multidentate ligands. The multivalent metals or metal ions and plurality of multidentate ligands bond to each other in a 2D MOF arrangement forming a crystalline structure. The crystalline structure has a lateral size of at least 5 µm and a thickness of less than 5 nm.

The above summary is not intended to represent each implementation or every aspect of the present disclosure. Additional features and benefits of the present disclosure are apparent from the detailed description and figures set forth below.

BRIEF DESCRIPTION OF THE DRAWINGS

Exemplary embodiments are illustrated in referenced figures. It is intended that the embodiments and figures disclosed herein are to be considered illustrative rather than restrictive.

FIG. 3A-3F show various characterizations of 2D MOFs, according to some implementations. FIG. 3A shows an optical image with an inset SEM image; FIG. 3B shows a TEM image and selective-area diffraction pattern (inset); FIG. 3C shows an AFM image; FIG. 3D shows the height profile of the 2D MOF shown in FIG. 3C; FIG. 3E shows XRD and comparison with that measured on precursor nanosheets and the simulated data for the 2D MOF; and FIG. 3F shows Raman spectra and comparison with that from the precursor.

FIG. 7A 1:1; FIG. 7B 4:1; FIG. 7C 7:1; and FIG. 7D 10:1, where the AFM image and height profile of are shown in the inset, and the dark particles on the surface in are unreacted precursors which can be reduced by washing multiple times. The upper right insets are illustrations of the shape of the 2D MOFs.

FIG. 8A-8D show chemical structures and optical images of two 2D MOFs according to some implementations; FIG. 8A shows the chemical structure of Ni-CAT; FIG. 8B shows the chemical structure of Ni-HAB; FIG. 8C shows an optical images of Ni-CAT, upper right inset is a picture of a solution of the compound in a vial; and FIG. 8D shows an optical image of Ni-HAB, upper right inset is a picture of a solution of the compound in a vial.

FIG. 10 shows the chemical structure of some multidentate ligands, according to some implementations.

Figure 1:
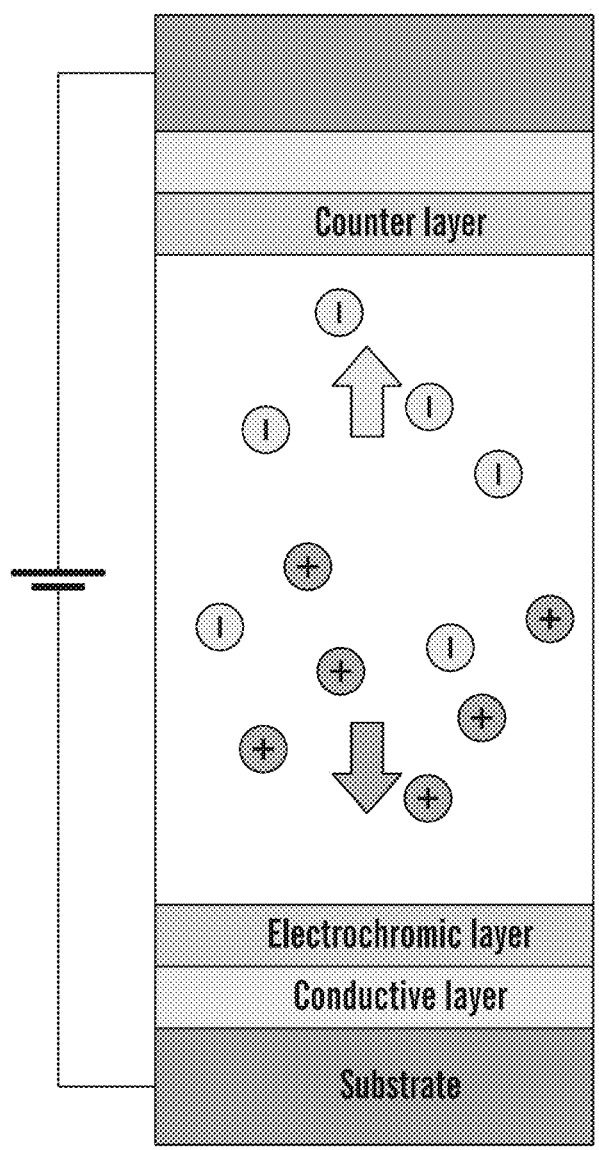
FIG. 1 shows the structure of a prior art electrochromic device.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The description herein relates to MOFs having low dimensionality. The MOFs accordingly can form rod like (e.g., micro- and nano-rods) and 2D sheets with very high aspect ratios. When formed as 2D MOF single crystals, the single crystals are extremely thin e.g., less than 5 nm. The MOFs are electrochromic and therefore can be used in electrochromic devices. Without being bound by a specific mechanism or theory, the high aspect ratio and thin nature of the MOFs allows the formation of very flexible devices to be made. In implementations using the 2D MOFs as smart windows, laying more than one of the flat crystals in a layered structure provides a tenability with respect to the intensity of adsorbed color.

According to some implementations, the disclosure is a two-dimensional metal organic framework (2D MOF). The 2D MOF includes a plurality of multivalent metals or metal ions and a plurality of multidentate ligands, arranged to form a crystalline structure. Generally, the 2D MOF has a width or lateral size of at least about 2.5 μm. For example, the 2D MOF has a width or lateral size of more than about 5.0, 7.5, 10, 15, 20, 25, 30, 40, 50, 60, 70, 80, 90 or 100 μm. In some implementations, the 2D MOF has a width of at least 5 μm. In some implementations, the 2D MOF has a width of at least 7.5 μm. In some implementations, the 2D MOF has a width of at least 10 μm. In some implementations, the 2D MOF has a width of at least 15 μm. In some implementations, the 2D MOF has a width of at least 20 μm. In some implementations, the 2D MOF has a width of at least 25 μm. In some implementations, the 2D MOF has a width of at least 30 μm. In some implementations, the 2D MOF has a width of at least 35 μm. In some implementations, the 2D MOF has a width of at least 7.5 μm. In some implementations, the 2D MOF has a width of at least 40 μm. In some implementations, the 2D MOF has a width of at least 45 μm. In some implementations, the 2D MOF has a width of at least 50 μm. In some implementations, the 2D MOF has a width of at least 55 μm. In some implementations, the 2D MOF has a width of at least 60 μm. In some implementations, the 2D MOF has a width of at least 65 μm. In some implementations, the 2D MOF has a width of at least 70 μm. In some implementations, the 2D MOF has a width of at least 75 μm. In some implementations, the 2D MOF has a width of at least 80 μm. In some implementations, the 2D MOF has a width of at least 85 μm. In some implementations, the 2D MOF has a width of at least 90 μm. In some implementations, the 2D MOF has a width of at least 95 μm. In some implementations, the 2D MOF has a width of at least 100 μm.

The 2D MOF described herein are thin. In some embodiment, the 2D MOF has a thickness of about 5 nm or lower. For example, the 2D MOF has a thickness of about 4.5 nm, 4 nm, 3.5 nm, 3 nm, 2.5 nm, 2 nm, 1.5 nm, 1 nm or less. In some embodiments, the 2D MOF has a thickness of about 4.5 nm or lower. In some embodiments, the 2D MOF has a thickness of about 4 nm or lower. In some embodiments, the 2D MOF has a thickness of about 3.5 nm or lower. In some embodiments, the 2D MOF has a thickness of about 3 nm or lower. In some embodiments, the 2D MOF has a thickness of about 2.5 nm or lower. In some embodiments, the 2D MOF has a thickness of about 2 nm or lower. In some embodiments, the 2D MOF has a thickness of about 1.5 nm or lower. In some embodiments, the 2D MOF has a thickness of about 1 nm or lower. In some embodiments, the 2D MOF has a thickness of about 0.75 nm or lower. In some embodiments, the 2D MOF has a thickness of about 0.5 nm or lower. In some embodiments, the 2D MOF has a thickness of about 0.25 or lower.

In some implementations, the 2D MOF has a width or lateral size, or mean size, of at least about 2.5 µm (e.g., at least about 5.0, 7.5, 10, 15, 20, 25, 30, 40, 50, 60, 70, 80, 90 or 100 µm) and a thickness of about 5 nm or lower (e.g., about 4.5 nm, 4 nm, 3.5 nm, 3 nm, 2.5 nm, 2 nm, 1.5 nm, 1 nm, 0.75 nm, 0.5 nm, 0.25 nm or lower). In some implementations, the crystalline structure is a single crystal. The aspect ratio of the 2D MOF can be very high, such as at least 1000. In some embodiments, the 2D MOF has an aspect ratio of at least 1500, 2000, 2500, 3000, 3500, 4000, 4500, 5000, 5500, 6000, 7000, 8000, 9000, 10 000, 100 000, or even at least 500 000. The aspect ratio is the ratio of the average width or lateral size (e.g., diameter) to the average thickness of the 2D MOF compound.

In some implementations, a plurality of the 2D MOFs has sizes as defined above. For example, the 2D MOF has a width or lateral mean size of at least about 2.5, 5, 7.5, 10, 15, 20, 25, 30, 40, 50, 60, 70, 80, 90 or 100 µm. In some implementations, the plurality of 2D MOF have a mean thickness of about 5 nm or lower (e.g., about 4.5 nm, 4 nm, 3.5 nm, 3 nm, 2.5 nm, 2 nm, 1.5 nm, 1 nm, 0.75 nm, 0.5 nm, 0.25 nm or lower); and a mean aspect ratio of at least 1000, 1500, 2500, 3000, 3500, 4000, 4500, 5000, 5500, 6000, 7000, 8000, 9000, 10000, 100000, or even at least 500 000.

In some implementations, the size distribution of a plurality of the 2D MOFs is narrow. For example, at least about 80%, e.g., at least about 85%, 90%, 91%, 92%, 93%, 94%, 95%, 96%, 97%, 98% or more of the 2D MOFs have a width or lateral size of at least about 5 µm. In some embodiments, at least about 80%, e.g., at least about 85%, 90%, 91%, 92%, 93%, 94%, 95%, 96%, 97%, 98% or more of the 2D MOFs have a width or lateral size of at least about 7.5 µm, 10 µm, 15 µm, 20 µm. 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, 100 µm or more. For example, at least about 80%, e.g., at least about 85%, 90%, 91%, 92%, 93%, 94%, 95%, 96%, 97%, 98% or more of the 2D MOFs have a width within 10% of the mean size. For example, at least about 80%, e.g., at least about 85%, 90%, 91%, 92%, 93%, 94%, 95%, 96%, 97%, 98% or more of the 2D MOFs have a width within 5% of the mean size. In some implementations, 90% of the 2D MOFs have a width within ±10% of the mean size. In some implementations, 90% of the 2D MOFs have a width within 55% of the mean size.

In some implementations, the 2D MOF includes a bilayer structure. For example, the 2D MOF includes a first single crystal nanosheet and a second single crystal nanosheet. Bonding within each nanosheet is by strong bonding such as covalent bonds. The first and second single crystal nanosheets bond to each other by weak interactions, such as van der Waals interactions, to form a single crystal bilayer 2D MOF. In some implementations, the 2D MOF includes more than two layers of single crystal nanosheets layered on top of each other to form a single crystal multilayer structure. According to some implementations, the 2D MOF has a uniform thickness. For example, having a thickness uniformity consistent with two single crystal nanosheet, one single crystal nanosheet, or no additional single crystal nanosheets. In some implementations the thickness is between about 5 and 1 nm, such as between about 4 and 2 nm.

According to some implementations, the 2D MOF forms a crystalline structure having a smooth surface. As used herein, a "smooth surface" refers to a surface exhibiting no irregularities greater than about one $1000^{th}$, about $10000^{th}$, about $100000^{th}$ or about 10000th of the thickness of the 2D MOF across the surface. For example, wherein the peak height to peak valley range is less than about 0.5 nm, less than about 0.45 nm, less than about 0.4 nm, less than about 0.35 nm, less than about 0.3 nm, less than about 0.25 nm, less than about 0.2 nm, less than about 0.15 nm, less than about 0.1 nm, less than about 0.075 nm, less than about 0.05 nm, less than about 0.025 nm, less than about 0.01 nm. In some implementations, the Rz value is less than about 0.5 nm, less than about 0.45 nm, less than about 0.4 nm, less than about 0.35 nm, less than about 0.3 nm, less than about 0.25 nm, less than about 0.2 nm, less than about 0.15 nm, less than about 0.1 nm, less than about 0.075 nm, less than about 0.05 nm, less than about 0.025 nm, less than about 0.01 nm. Herein Rz is the roughness measured as the difference in height between the average of five highest peaks and five lowest valleys in the evaluation profile/surface.

According to some implementations, the surface roughness is at least in part influenced by a substrate the 2D MOF is deposited on. For example, the measured roughness of the 2D MOF is higher on a rougher surface than on surface having lower surface roughness. In some implementations, the surface roughness of the 2D MOF is higher when deposited on the surface than the roughness of the 2D MOF if it were not deposited on a surface.

In some implementations, the surface includes a plurality of single crystal 2D MOF. The plurality of single crystal 2D MOFs can form a single layer with adjacent single crystals touching each other. In some implementations, the plurality of single crystal 2D MOFs can stack on top of each other to form two or more layers. In some implementations, the surface roughness over the plurality of crystals is larger than the surface roughness of one of the 2D MOF single crystals, for example, due to some overlap between adjacent crystals, small gaps between adjacent single crystals, or imperfect (e.g., non-crystal aligned) stacking of the single crystals.

In some implementations, the 2D MOF is anisotropic in the layer plane (i.e., the plane containing the x-axis and y-axis). As used herein, anisotropic refers to the properties of the 2D MOF are different along different crystal orientations due to the structural anisotropy. For example, the optical absorption with the light polarization along a first direction (e.g. along x-axis of the crystal) is higher than that along a second direction (e.g. along y-axis of the crystal). In some implementations, the 2D MOF single crystals exhibit a two-fold symmetry, e.g., a mirror plane symmetry or a rotational symmetry about the z-axis. For example, the symmetry elements can be perpendicular to the xy plane/layer or width dimension (i.e., in the same direction as the thickness) or parallel to the width dimension (i.e., along parallel to the layer plane). In some implementations, the 2D MOF single crystals have higher symmetry, such as three-fold symmetry, four-fold symmetry, and six-hold symmetry, such as rotational axis along the z axis.

The 2D MOF can include a multivalent metal or metal ion, optionally selected from transition metal ions. In some implementations, the transition metal is a first row transition metal, such as Ni, Cu and Fe. In some other implementations, the transition metal is a second or third row transition metal, such as Mo and W.

As used herein, a multidentate ligand is a linking molecule that has at least two functional groups. The multidentate ligand includes a core, and the functional groups are bonded to the core so that the functional groups extend outwards from a periphery of the core. In some implementations, at least two of the functional groups are opposite to each other from the core of the multidentate ligand. Optionally, the functional groups are selected from one or more of a carboxylate, an amine, a hydroxyl, a sulfide, a sulfate, an ether, a thiol, or an ion thereof. In some implementations, the functional groups are bonded to the multivalent metal. For example, each functional group of the multidentate ligand is capable of forming a bond to the multivalent metal. The bonds between the functional group and multidentate ligand are directional bonds, such as covalent, coordination, dative, or coordinate covalent bonds.

In some implementations, the multidentate ligand includes an aromatic core structure and two or more functional groups attached to the periphery of the aromatic core. Optionally, the multidentate ligand is selected from: 1,4-benzenedicarboxylate (BDC); 2,3,6,7,10,11-hexahydroxytriphenylene (CAT); hexaaminobenzene (HAB); dipyrimidinedisulfide ($pym_2S_2$); tetrakis(4-carboxyphenyl) porphyrin (TCPP); 2,5-dihydroxy-3,6-dichloro-1,4-benzoquinone ($H_2C_6O_4Cl_2$); 2,5-dihydroxy-3,6-dibromo-1,4-benzoquinone ($H_2C_6O_4Br_2$); benzenehexathiol (BHT); triphenylenehexathiol (THT); and triphenylenehexamine (THA). In some implementations, the 2D MOF has a molecular formula Ni-BDC, Ni-CAT, Ni-HAB, Ni-$pym_2S_2$, Ni-TCPP, Ni—$H_2C_6O_4Cl_2$, Ni-BHT, Ni-THT, Ni-THA, Cu-BDC, Cu-CAT, Cu-HAB, Cu-$pym_2S_2$, Cu-TCPP, Cu—$H_2C_6O_4Cl_2$, Cu-BHT, Cu-THT, Cu-THA, Fe-BDC, Fe-CAT, Fe-HAB, Fe-$pym_2S_2$, Fe-TCPP, Fe—$H_2C_6O_4Cl_2$, Fe-BHT, Fe-THT, Fe-THA, Mo-BDC, Mo-CAT, Mo-HAB, Mo-$pym_2S_2$, Mo-TCPP, Mo—$H_2C_6O_4Cl_2$, Mo-BHT, Mo-THT, Mo-THA, W-BDC, W-CAT, W-HAB, W-$pym_2S_2$, W-TCPP, W—$H_2C_6O_4Cl_2$, W-BHT, W-THT, and W-THA. In some implementations the formal oxidation state of the metal is +4.

According to some implementations, the 2D MOF is electrochromic. In some implementations, the 2D MOF has at least two stable oxidation states, or at least three stable oxidation states, at least four stable oxidation states, at least five stable oxidation states, at least six stable oxidation states. In some implementations, each oxidation state of the compound corresponds to a different UV-Vis absorption spectrum for the MOF. Without being bound to a specific mechanism, the stable oxidation state allows a specific UV-Vis adsorption to be switched on by a first voltage, providing a color to the 2D MOF. The color is maintained even when the voltage is removed and can be changed by application of a second voltage. Accordingly, the 2D MOF stores the memory of the voltage applied to it without needing a continuous voltage to be applied.

According to some implementations, the disclosure is a method for preparing a metal oxide compound, such as a metal oxide nanosheet. The method includes mixing a metal containing precursor with a surfactant at a high temperature for a period of time. In some implementations, the metal oxide is prepared by a hydrothermal, surfactant surface assisted synthesis.

As used herein, metal oxides include any one or more of the metals described herein (e.g., transition metals) bonded to oxygen and other atoms or functional groups. In some implementations, metal oxides include one or more of hydroxide functional groups, amine functional groups, sulfur containing functional groups, sulfur, and nitrogen. For example, metal oxides can include metal hydroxides, metal sulfides, metal oxy sulfides, and metal oxy nitrides. In some implementations, the metal oxide is a metal hydroxide. In some implementations, the metal oxides are used in a concentration of between about 0.1 to 2 mg/mL e.g., in a solution including the surfactant.

In some implementations, the metal oxide is a layered metal oxide. As used herein, layered metal oxides are compounds that have strong coordination bonds in each layer, and weaker bonds, such as van der Waals interactions, between the layers. Some metal oxides find use, for example, as pigments, sorbents, and lubricants. A more recent use is for lithium ion secondary batteries due to their ability to intercalate small ions such as lithium.

In some implementations, the metal oxide nanosheet has a width or lateral size of at least about 2.5 µm. For example, the metal oxide nanosheet has a width or lateral size of at least about 5.0, 7.5, 10, 15, 20, 25, 30, 35, 40, 45, 50, 55, 60, 65, 70, 75, 80, 85, 90, 95 or 100 µm. In some embodiments, the metal oxide nanosheet has a width or lateral size of at least about 5 µm. In some embodiments, the metal oxide nanosheet has a width or lateral size of at least about 7.5 µm. In some embodiments, the metal oxide nanosheet has a width or lateral size of at least about 10 µm. In some embodiments, the metal oxide nanosheet has a width or lateral size of at least about 15 µm. In some embodiments, the metal oxide nanosheet has a width or lateral size of at least about 20 µm. In some embodiments, the metal oxide nanosheet has a width or lateral size of at least about 25 µm. In some embodiments, the metal oxide nanosheet has a width or lateral size of at least about 30 µm. In some embodiments, the metal oxide nanosheet has a width or lateral size of at least about 35 µm. In some embodiments, the metal oxide nanosheet has a width or lateral size of at least about 35 µm. In some embodiments, the metal oxide nanosheet has a width or lateral size of at least about 40 µm. In some embodiments, the metal oxide nanosheet has a width or lateral size of at least about 45 µm. In some embodiments, the metal oxide nanosheet has a width or lateral size of at least about 50 µm. In some embodiments, the metal oxide nanosheet has a width or lateral size of at least about 55 µm. In some embodiments, the metal oxide nanosheet has a width or lateral size of at least about 60 µm. In some embodiments, the metal oxide nanosheet has a width or lateral size of at least about 65 µm. In some embodiments, the metal oxide nanosheet has a width or lateral size of at least about 70 µm. In some embodiments, the metal oxide nanosheet has a width or lateral size of at least about 75 µm. In some embodiments, the metal oxide nanosheet has a width or lateral size of at least about 80 µm. In some embodiments, the metal oxide nanosheet has a width or lateral size of at least about 85 µm. In some embodiments, the metal oxide nanosheet has a width or lateral size of at least about 90 µm. In some embodiments, the metal oxide nanosheet has a width or lateral size of at least about 95 µm. In some embodiments, the metal oxide nanosheet has a width or lateral size of at least about 100 µm.

In some implementations, the produced metal oxide nanosheet has a thickness of about 5 nm or lower. For example, the produced metal oxide nanosheet has a thickness of about 4.5 nm, 4 nm, 3.5 nm, 3 nm, 2.5 nm, 2 nm, 1.5 nm, 1 nm, 0.75 nm, 0.5 nm, 3 nm, 2.5 nm, 2 nm, 1.5 nm, 1 nm or less. In some embodiments, the produced metal oxide nanosheet has a thickness of about 4.5 nm or lower. In some embodiments, the the produced metal oxide nanosheet has a thickness of about 4 nm or lower. In some embodiments, the produced metal oxide nanosheet has a thickness of about 3.5 nm or lower. In some embodiments, the produced metal oxide nanosheet has a thickness of about 3 nm or lower. In some embodiments, the produced metal oxide nanosheet has a thickness of about 2.5 nm or lower. In some embodiments, the produced metal oxide nanosheet has a thickness of about 2 nm or lower. In some embodiments, the produced metal oxide nanosheet has a thickness of about 1.5 nm or lower. In some embodiments, the produced metal oxide nanosheet has a thickness of about 1 nm or lower. In some embodiments, the produced metal oxide nanosheet has a thickness of about 0.75 nm or lower. In some embodiments, the produced metal oxide nanosheet has a thickness of about 0.5 nm or lower. In some embodiments, the produced metal oxide nanosheet has a thickness of about 0.25 or lower.

In some implementations, the produced metal oxide nanosheet has a high aspect ratio. For example, the metal oxide compound is a crystalline compound formed as a nanosheet having an aspect ratio of at least 1000. In some embodiments, the metal oxide compound is a crystalline compound formed as a nanosheet having an aspect ratio of at least 1500, 2000, 2500, 3000, 3500, 4500, 4500, 5000, 5500, 6000, 7000, 8000, 9000 or even at least 10,000. In some implementations, the metal oxide compound is a crystalline compound formed as a nanosheet having a surface area on a first side of at least 10 $\mu m^2$. For example, the metal oxide compound is a crystalline compound formed as a nanosheet having a surface area on a first side of at least about 15, 20, 25, 30, 35, 40, 45, 50, 55, 60, 65, 70, 75, 80, 85, 90, 95, 100, 125, 150, 175, 200, 500, 1000, or 10,000 $\mu m^2$.

Surfactants find wide application in sol-gel synthesis, forming templates and structuring units such as emulsions (including microemulsions), liposomes, bi-layers, 3D-continuous structures and micelles. The most common way of classifying and ranking the properties of the many different types of surfactants, both natural and synthetic, is by the use of the hydrophile/lipophile balance (HLB). The nature of the hydrophilic group (also known as the "head") provides the most useful means for categorizing the different surfactants used in formulations (Rieger, in Pharmaceutical Dosage Forms, Marcel Dekker, Inc., New York, N.Y., 1988, p. 285)).

In some implementations, the surfactant is a nonionic surfactant. In some implementations, the surfactant is an ionic surfactant, such as an anionic or cationic surfactants. In some other implementations, the surfactant is an amphoteric surfactant.

If the surfactant molecule is not ionized, it is classified as a nonionic surfactant. Nonionic surfactants find wide application in pharmaceutical and cosmetic products and are usable over a wide range of pH values. In general, their hyrophile-lipophile balance (HLB) values range from 2 to about 18 depending on their structure. Nonionic surfactants include nonionic esters such as ethylene glycol esters, propylene glycol esters, glyceryl esters, polyglyceryl esters, sorbitan esters, sucrose esters, and ethoxylated esters. Nonionic alkanolamides and ethers such as fatty alcohol ethoxylates, propoxylated alcohols, and ethoxylated/propoxylated block polymers are also included in this class. The polyoxyethylene surfactants are the most popular members of the nonionic surfactant class.

If the surfactant molecule carries a negative charge when it is dissolved or dispersed in water, the surfactant is classified as anionic. Anionic surfactants include carboxylates such as soaps, acyl lactylates, acyl amides of amino acids, esters of sulfuric acid such as alkyl sulfates and ethoxylated alkyl sulfates, sulfonates such as alkyl benzene sulfonates, acyl isethionates, acyl taurates and sulfosuccinates, and phosphates. The most important members of the anionic surfactant class are the alkyl sulfates and the soaps.

If the surfactant molecule carries a positive charge when it is dissolved or dispersed in water, the surfactant is classified as cationic. Cationic surfactants include quaternary ammonium salts and ethoxylated amines. The quaternary ammonium salts, such as cetyltrimethyl ammonium halides, and hexamethylenetetramine compounds (e.g., halides or another counter ion containing compound) are the most used members of this class.

If the surfactant molecule carries a negative charge when it is dissolved or dispersed in water, the surfactant is classified as anionic. Anionic surfactants include carboxylates such as soaps, acyl lactylates, acyl amides of amino acids, esters of sulfuric acid such as alkyl sulfates and ethoxylated alkyl sulfates, sulfonates such as alkyl benzene.

If the surfactant molecule has the ability to carry either a positive or negative charge, the surfactant is classified as amphoteric. Amphoteric surfactants include acrylic acid derivatives, substituted alkylamides, N-alkylbetaines and phosphatides.

In some implementations of the method for preparing a metal oxide nanosheet, the mixture comprises an aprotic solvent and a protic solvent. In some implementations, the aprotic solvent to the protic solvent is provided in a ratio of 1:10 to 10:1 (e.g., more than 2:10, more than 5:10, or more than 7:10; and less than 10:1, less than 7:1 less than 5:1, or less than 2:1).

As used herein, a protic solvent includes solvents that can form hydrogen bonds with themselves. For example, solvents having hydroxyl and primary and secondary amine groups. As used herein, an aprotic solvent cannot form hydrogen bonds with itself. In some implementations, the aprotic solvent is dimethylsulfoxide (DMSO), dimethylformamide (DMF), acetonitrile, tetrahydrofurane (THF), diethyl ether, an ether, dioxane, a ketone, Hexamethylphosphoramide (IMPA), 1,3-Dimethyl-2-imidazolidinone (DMI), or a mixture thereof. In some implementations, the protic solvent is water, an organic acid, ammonia, an amine, an alcohol, or a mixture thereof. In some implementations, the second solvent is water and the first solvent is DMSO.

In some implementations, the high temperature is selected to be in a range of from 50 to 180° C., such as between about 80 and 140° C., or between about 90 and 120° C.

In some implementations, the period of time used is from 12 to 60 hours. For example, between 12 to 24 hours, between 24 to 48 hours, between 48 to 60 hours.

In some implementations, the pH of the mixture is between about 4 to 8, such as about 4.0, 4.5, 5.0, 5.5, 6.0, 6.5, 7.0, 7.5 or 8.0. The pH can be adjusted by any useful mineral or organic acid such as hydrochloric acid, phosphoric acid, sulfuric acid, boric acid, hydrofluoric acid, nitric acid, acetic acid, lactic acid, formic acid, citric acid, oxalic acid, uric acid, malic acid, or tartaric acid.

In some implementations, the method for preparing the metal oxide does not include any addition additive except for the ingredients described herein. In some implementations, the method consists of the essential ingredients of the metal oxide, a surfactant, a solvent consisting of a homogeneous mixture of an aprotic and protic solvent, and an acid to adjust the pH.

According to some implementations, the disclosure if for a method of preparing an MOF (e.g., a 2D MOF). The method includes reacting the metal oxide compounds as described herein. The metal oxide compounds are suspended in a liquid with a multidentate ligand dissolved in the liquid to react. The reaction forming the MOF occurs while at least a portion of the metal oxide is not dissolved in the liquid, and the product 2D MOF is at least partially insoluble in the liquid.

As used herein "suspended" refers to the metal oxide compound being dispersed in a liquid. That is, the metal oxide can be added as a powder that is added to the liquid. For example, the powder can have a mean particle size between about 10 nm and 1000 µm. The metal oxide has low solubility (e.g., less than about 5 wt. % solubility, less than about 1 wt. %, less than about 0.1 wt. %) in the liquid. The metal oxide remains suspended or settles into a loosely held layer at the bottom of the reaction vessel, but can be re-suspended with mild agitation. In some implementations, the product MOF also has a low solubility in the liquid.

In some implementations, the liquid is a homogeneous mixture including at least a first solvent and a second solvent. Optionally, the first solvent is an aprotic solvent, and the second solvent is a protic solvent. In some implementations, the molar ratio of the aprotic solvent to the protic solvent is between about 1:10 to 10:1. The selection of ratio provides control of the product morphology. For example, in some implementations, the molar ratio is less than about 4:1, such as 3:1, 2:1 or 1:1; and the MOF is optionally formed as a rods which length to diameter ratio increases with the ratio of aprotic to protic solvent. In some implementations, the rods have a length between about 1 and 100 µm, such as between 1 and 50 µm or 1 and 10 µm. In some implementations, the rods have a thickness between about 1 and 8000 nm, such as between about 1 and 5000 nm, 1 and 100 nm or 1 and 10 nm. In some implementations, the molar ratio is between about 4:1 and 7:1, and the MOF is optionally formed as flakes, wherein the width to thickness ratio increases with the ratio. The flakes have a high aspect ratio, but not as high as the 2D MOFs described herein for the same synthetic system (e.g., same solvents but different ratios of the aprotic to protic solvents). In some implementations, the flakes have an aspect ratio of less than 10 000, less than 9000, less than 8000, less than 7000, less than 6000, or less than 5000. In some implementations, the molar ratio is between about 7:1 and 10:1, and the MOF are optionally formed as 2D MOFs.

In some implementations, the MOF is prepared at temperature in range of from 50 to 180° C., such as between about 80 and 140° C., or between about 90 and 120° C. In some implementations, the period of time used for the reaction from 12 to 60 hours. For example, between 12 to 24 hours, between 24 to 48 hours, between 48 to 60 hours.

In some implementations, the method for forming the MOF includes removing the MOF product from the liquid when it has reacted for a time to complete the reaction and provide the desired single crystal having a high aspect ratio. For example, the desired single crystal can include a 2D MOF as described herein, such as being a planar single crystal having an aspect ratio of at least 5000 to 1, a surface area on a first side of at least 500 µm², and a thickness of at least 5 nm. In some implementations, additional metal oxide containing compound is added to complete the reaction. In some implementation, additional multidentate ligand is added to complete the reaction.

In some aspects, the description includes an intermediate compound and its formation. The intermediate compound is a flat compound having a high aspect ratio. In some implementations, the intermediate compound includes a center composition of the metal oxide compound, and a periphery composition of the MOF. In some implementations, the intermediate compound includes a periphery composition of the metal oxide compound, and a center composition of the MOF. Without being bound to a specific mechanism, the intermediate compounds relate to growth of the MOF phase at the expense of the metal oxide phase. At the interface between the growing MOF phase and the receding metal oxide phase, a mixed phase can also exist. In implementations where seeding of MOF occurs in the center, multiple seeding can occur in the center of the metal oxide precursor. In implementations where seeding of the MOF occurs at a periphery of the metal oxide, multiple seeding can occur at the periphery. In some implementations, only one seed of the 2D MOF forms per precursor metal oxide, growing into a single crystal.

According to some implementations, the disclosure is for a substrate where at least a portion of a surface of the substrate includes a 2D MOF as described herein. The substrate can be any substrate such as a semiconductor, quartz, polycrystalline silicon, silicon nitride, silicon oxy-nitride, crystalline silicon, glass, indium tin oxide (ITO), boron nitride (BN), diamond, a polymer, polyethylene terephthalate (PET), flexible material, a conductive material, a metal, graphite or graphene. In some implementations, the is a semiconductor, quartz, polycrystalline silicon, silicon, crystalline silicon, glass, indium tin oxide (ITO), boron nitride (BN), diamond, a polymer, polyethylene terephthalate (PET), flexible material, a conductive material, a metal, graphite or graphene. In some implementations, the flexible material is a plastic, a polymer, a 2D material film, a metal (e.g., a metal foil), or a glass foil. In some embodiments, the substrate is a semiconductor. In some embodiments the substrate is quartz. In some embodiments the substrate is polycrystalline silicon. In some embodiments the substrate is silicon nitride. In some embodiments the substrate is silicon oxy-nitride. In some embodiments the substrate is crystalline silicon. In some embodiments the substrate is glass. In some embodiments the substrate is indium tin oxide (ITO). In some embodiments the substrate is boron nitride (BN). In some embodiments the substrate is diamond. In some embodiments the substrate is a polymer. In some embodiments the substrate is polyethylene terephthalate (PET). In some embodiments the substrate is a flexible material. In some embodiments the substrate is a conductive material. In some embodiments the substrate is a metal. In some embodiments the substrate is a graphite. In some embodiments the substrate is a graphene.

In some implementation, the substrate is an electrode or comprised in an electrode. In some implementations, the substrate is transparent to visible light. In some implementations, the substrate has a surface roughness Rz less than about about 500 nm, less than about 300 nm, less than about 100 nm, or less than about 10 nm. In some implementations, the electrode is a flexible electrode including a graphene substrate.

In some implementations, the 2D MOF and substrate are further processed to provide a pattern of MOF on the substrate. Methods such as those used in the semiconductor industry are contemplated for processing the MOF. Without limitation, processing can include one or more of lithography, photolithography, electron-beam lithography, laser writing, chemical etching, reactive ion etching, plasma etching, vacuum thermal evaporation, electron-beam evaporation, spin coating, Marangoni assembly techniques, Langmuir-Blodgett techniques, dip-coating, inkjet printing and 3D printing. In addition to patterning, processing before or after can be implemented to provide lines, vias, contacts, and electrodes using conductors (e.g., metals such as copper, gold, aluminum, platinum, graphite). Deposition on top of the 2D MOF can also be implemented with protective transparent coatings e.g., silicon oxide, silicon nitride, ITO, polymer and plastic.

In some implementations, the 2D MOF forms a film on the surface of the substrate. The film can be a continuous film, such as where each single crystal 2D MOF is in contact with at least another single crystal 2D MOF. In some implementations, the film is not continuous and consists of several islands of 2D MOFs on the substrate surface. In some implementations, the film, continuously or non-continuously, covers an area between about 1 mm$^2$ to 10 m$^2$, e.g., more than about, 1 mm$^2$, 1 cm$^2$, 10 cm$^2$, 100 cm$^2$, or 1 m$^2$; and less than about 10 m$^2$, 1 m$^2$, 100 cm$^2$, 10 cm$^2$, or Cm$^2$.

In some implementations, the single crystal 2D MOFs are stacked on top of each other, where the stacking is in the direction perpendicular to the surface of the substrate. The stacking can include any number of single crystal 2D MOFs such as between about 2 to 10 000, or about 2 to 5000, about 2 to 1000, about 2 to 500, about 2 to 100, about 2 to 50, or about 2 to 10. Without being bound to a specific theory, the stacking of crystals provides a way to tune the opacity, transparency, or reflectivity of the stack of 2D MOFs.

In some implementations, the substrate is a part of an electrochromic device. For example, in some implementations the device includes a layer of the 2D MOFs on the substrate. In some implementations, the device includes a plurality of pixels. Each pixel can include a single crystal of the 2D MOF. Optionally, each pixel can include a plurality of single crystal 2D MOFs, such as a film or stack as previously described.

In some implementations of an electrochromic device, the 2D MOF are positioned between a first electrode and a second electrode and immersed in an electrolyte. The 2D MOF are electrically connected with a first electrode. The 2D MOF are in ion current contact with the second electrode. The second electrode can include an ion storage layer over the second electrode and in contact with the electrolyte. For example, the ion storage layer can include a carbon material such as graphite. The ion storage layer provides a stable storage for ions such as by intercalation, and is in electrical contact with the second electrode. In some implementations, the electrolyte includes a lithium ion. For example, the lithium ion can be provided from a lithium salt such as LiPF$_6$, LiBF$_4$ or LiClO$_4$. In some implementations, the electrolyte includes an organic solvent such as ethylene carbonate, dimethyl carbonate, and diethyl carbonate. The electrolyte can also include polymer electrolytes and gels, such as polyethylene oxide, poly vinyl pyrrolidone (PVP), poly (N-dimethyl acrylamide) (PDMAA). In some implementations, the electrodes include one or more conductive material such as a metal, metal foil, metal nano-fibers, metal micro-fibers (e.g., the metal containing materials including titanium, steel, gold, aluminum, platinum, tungsten, nickel, copper), carbon, carbon sheets, carbon fibers, carbon nanofibers (e.g., carbon materials including glassy carbon, graphite, and carbon nanotubes), and a conductive polymer (e.g., polypyrrole, polyaniline and polythiophene). Without limitation, the electrochromic device can include components, chemicals and materials used in lithium ion secondary batteries and the 2D MOFs described herein.

In some implementations, the electrodes provide at least 2 (e.g., at least 3, at least 4, at least 5 at least 6) different voltages, each corresponding to an oxidation state of the single crystal 2D MOF. Each oxidation state corresponding to a different UV-Vis absorption spectra of the single crystal 2D MOF.

In some implementations, the electrochromic devices can be used for smart windows such as for cars, trains, airplanes and buildings. In some implementations, the electrochromic device is operated to modulate reflected light, such as for a smart mirror (e.g., a smart car mirror). The electrochromic devices can also be used for making display devices, such as for signs, tablets, phones, computer monitors and the like. In some implementations, the display devices are flexible display devices.

Embodiments of various aspects described herein can be defined as in any of the following numbered paragraphs:

1. A two-dimensional metal organic framework (2D MOF) comprising:
   a plurality of multivalent metals or metal ions and a plurality of multidentate ligands arranged to form a crystalline structure having a lateral size of at least about 2.5 μm and a thickness of about 5 nm or less.
2. The 2D MOF according to paragraph 1, wherein the crystalline structure is a single crystal.
3. The 2D MOF according to paragraph 1 or 2, wherein the crystalline structure has an aspect ratio of at least 1000.
4. The 2D MOF according to any one of paragraphs 1 to 3, wherein the 2D MOF comprises a bilayer structure.
5. The 2D MOF according to any one of paragraphs 1 to 4, wherein the 2D MOF has a smooth surface.
6. The 2D MOF according to any one of paragraphs 1 to 5, wherein the 2D MOF is anisotropic.
7. The 2D MOF according to any one of paragraphs 1 to 6, wherein the 2D MOF has two-fold symmetry, three-fold symmetry, four-fold symmetry or six-fold symmetry.
8. The 2D MOF according to any one of paragraphs 1 to 7, wherein the 2D MOF has uniform thickness.
9. The 2D MOF according to any one of paragraphs 1 to 8, wherein the multivalent metal or metal ion is a transition metal.
10. The 2D MOF according to paragraph 9, wherein the transition metal is a first row transition metal.
11. The 2D MOF according paragraph 10, wherein the transition metal is Ni, Cu or Fe.
12. The 2D MOF according to paragraph 9, wherein the transition metal is a second row or third row transition metal, such as Mo and W.
13. The 2D MOF according to any one of paragraphs 1 to 12, wherein the multidentate ligand includes an aromatic core structure and two or more functional groups attached to the periphery of the aromatic core and each functional group is capable of forming a bond to the multivalent metal.
14. The 2D MOF according to any one of paragraphs 1 to 13, wherein the multidentate ligand includes functional groups covalently bonded to the multivalent metal, the functional groups selected from one or more of a carboxylate, an amine, a hydroxyl, a sulfide, a sulfate, an ether, a thiol or an ion thereof
15. The 2D MOF according to any one of paragraphs 1 to 14, wherein the multidentate ligand is selected from: 1,4-benzenedicarboxylate (BDC); 2,3,6,7,10,11-hexahydroxytriphenylene (CAT); hexaaminobenzene (HAB); dipyrimidinedisulfide (pym$_2$S$_2$); tetrakis(4-carboxyphenyl)porphyrin (TCPP); 2,5-dihydroxy-3,6-dibromo-1,4-benzoquinone (H$_2$C$_6$O$_4$Br$_2$); 2,5-dihydroxy-3,6-chloro-1,4-benzoquinone (H$_2$C$_6$O$_4$Cl$_2$);

benzenehexathiol (BHT); triphenylenehexathiol (THT); and triphenylenehexamine (THA).

16. The 2D MOF according to any one of paragraphs 1 to 15, wherein the 2D MOF has a molecular formula Ni-BDC, Ni-CAT, Ni-HAB, Ni-pym$_2$S$_2$, Ni-TCPP, Ni—H$_2$C$_6$O$_4$Cl$_2$, Ni-BHT, Ni-THT, Ni-THA, Cu-BDC, Cu-CAT, Cu-HAB, Cu-pym$_2$S$_2$, Cu-TCPP, Cu—H$_2$C$_6$O$_4$Cl$_2$, Cu-BHT, Cu-THT, Cu-THA, Fe-BDC, Fe-CAT, Fe-HAB, Fe-pym$_2$S$_2$, Fe-TCPP, Fe— H$_2$C$_6$O$_4$Cl$_2$, Fe-BHT, Fe-THT, Fe-THA, Mo-BDC, Mo-CAT, Mo-HAB, Mo-pym$_2$S$_2$, Mo-TCPP, Mo— H$_2$C$_6$O$_4$Cl$_2$, Mo-BHT, Mo-THT, Mo-THA, W-BDC, W-CAT, W-HAB, W-pym$_2$S$_2$, W-TCPP, W—H$_2$C$_6$O$_4$Cl$_2$, W-BHT, W-THT, and W-THA.

17. The MOF according to any one of paragraphs 1 to 16, wherein the MOF is electrochromic.

18. The 2D MOF according to any one of paragraphs 1 to 17, wherein the MOF has at least two stable oxidation states.

19. The 2D MOF according to paragraph 18, wherein the compound has at least three stable oxidation states.

20. The 2D MOF according to any one of paragraphs 17 to 19, wherein each oxidation state of the compound corresponds to a different UV-Vis absorption spectrum for the MOF.

21. A method for preparing a metal oxide nanosheet, the method comprising:
mixing a metal containing precursor with a surfactant at a high temperature for a period of time, wherein the produced metal oxide nanosheet has a lateral size of at least 2.5 µm and a thickness of less than 5 nm.

22. The method according to paragraph 21, wherein the mixture comprises an aprotic solvent and a protic solvent, the aprotic solvent to the protic solvent is provided in a ratio of 1:10 to 10:1.

23. The method according to paragraph 21 or 22, wherein the high temperature is selected to be in a range of from 50 to 180° C.

24. The method according to any one of paragraphs 21 to 23, wherein the period of time is from 12 to 60 hours.

25. The method according to any one of paragraphs 21 to 24, wherein no additional additives are used.

26. The method according to any one of paragraphs 21 to 25, wherein the pH of the mixture is from 4 to 8.

27. The method according to any one of paragraphs 21 to 25, wherein the concentration of the metal oxide is from 0.1 to 2 mg/mL.

28. A method of preparing an MOF, such as a 2D MOF, the method comprising;
reacting a metal oxide compound suspended in a liquid with a multidentate ligand dissolved in the liquid, wherein the reaction occurs while at least a portion of the metal oxide is not dissolved in the liquid, and the product MOF is at least partially insoluble in the liquid.

29. The method according to paragraph 28, wherein the metal oxide is a layered metal oxide.

30. The method according to paragraph 28 or 29, wherein the metal oxide compound is a crystalline compound formed as a nanosheet having an aspect ratio of at least 1000, and a surface area on a first side of at least 10 µm$^2$.

31. The method according to any one of paragraphs 28 to 20, wherein the metal oxide compound is prepared by a hydrothermal, surfactant surface assisted synthesis.

32. The method according to any one of paragraphs 28 to 31, wherein the metal oxide is a metal hydroxide.

33. The method according to any one of paragraphs 28 to 32, wherein the metal oxide compound is a metal oxide nanosheet prepared according to paragraph 21.

34. The method according to any one of paragraphs 28 to 33, wherein the liquid is a homogeneous mixture including at least a first solvent and a second solvent.

35. The method according to paragraph 34, wherein the first solvent is an aprotic solvent, and the second solvent is a protic solvent.

36. The method according to paragraph 35, wherein the molar ratio of the aprotic solvent to the protic solvent is between about 1:10 to 10:1.

37. The method according to paragraph 36, wherein the molar ratio is less than about 4:1, such as 3:1, 2:1 or 1:1; and the MOF is optionally formed as a rod which length to diameter ratio increases with the ratio.

38. The method according to paragraph 36, wherein the molar ratio is between about 4:1 and 7:1, and the MOF is optionally formed as a flake, wherein the width to thickness ratio increases with the ratio.

39. The method according to paragraph 37, wherein the molar ratio is between about 7:1 and 10 to 1, and the MOF is formed as a 2D MOF having a high aspect ratio.

40. The method according to any one of paragraphs 34 to 40, wherein the first solvent is dimethylsulfoxide (DMSO), dimethylformamide (DMF), acetonitrile, tetrahydrofurane (THF), diethyl ether, an ether, dioxane, a ketone, Hexamethylphosphoramide (HMPA) and 1,3-Dimethyl-2-imidazolidinone (DMI), or a mixture thereof.

41. The method according to any one of paragraphs 34 to 39, wherein the second solvent is water, an organic acid, ammonia, an amine, an alcohol, or a mixture thereof.

42. The method according to any one of paragraphs 34 to 41, wherein the second solvent is water and the first solvent is DMSO.

43. The method according to any one of paragraphs 28 to 42, further comprising heating the liquid to a temperature between about 50 and 180 degrees Celsius.

44. The method according to any one of paragraphs 28 to 43, further comprising removing the MOF product from the liquid when it has reacted for a time to provide a planar single crystal having an aspect ratio of at least 1000 to 1, a surface area on a first side of at least about 5 µm$^2$, and a thickness of 5 nm or less.

45. The method of paragraph 44, further comprising adding one or more of (i) additional metal oxide compound, and (ii) additional multidentate ligand.

46. The method according to any one of paragraphs 28 to 45, further comprising forming an intermediate compound including a center composition of the metal oxide compound, and a periphery composition comprising the MOF.

47. The method according to any one of paragraphs 28 to 45, further comprising forming an intermediate compound including a periphery composition of the metal oxide compound, and a center composition of the MOF.

48. The method according to any one of paragraphs 28 to 47, wherein the metal oxide compound comprises a transition metal.

49. The method according to any one of paragraphs 28 to 48, wherein the multidentate ligand includes an aromatic core structure and two or more functional groups disposed on the periphery of the aromatic core.

50. A substrate comprising on at least part of a surface of the substrate the 2D MOF according to any one of paragraphs 1 to 20.
51. The substrate of paragraph 50, wherein the substrate comprises a material selected a semiconductor, quartz, polycrystalline silicon, silicon nitride, silicon oxy-nitride, crystalline silicon, glass, indium tin oxide (ITO), boron nitride (BN), diamond, a polymer, polyethylene terephthalate (PET), flexible material, a conductive material, a metal, graphite or graphene.
52. The substrate of paragraph 51, wherein the flexible material includes a plastic, a polymer, a 2D material film, a metal foil, or a glass foil.
53. The substrate according to any one of paragraphs 50 to 53, wherein the 2D MOF is coated or further processed into a pattern on the substrate.
54. The substrate according to paragraph 53, wherein the 2D MOF is processed by using one or more of lithography, photolithography, electron-beam lithography, laser writing, chemical etching, reactive ion etching, plasma etching, vacuum thermal evaporation, electron-beam evaporation, spin coating, Marangoni assembly techniques, Langmuir-Blodgett techniques, dip-coating, inkjet printing and 3D printing.
55. The substrate according to any one of paragraphs 50 to 54, wherein the substrate is an electrode.
56. The substrate according to any one of paragraphs 50 to 55, wherein the substrate is transparent to visible light.
57. The substrate according to any one of paragraphs 50 to 56, wherein the 2D MOF forms a film on at least a portion of the surface.
58. The substrate to paragraph 57, wherein the film covers an area between 1 mm$^2$ and 10 m$^2$.
59. The substrate according to any one of paragraphs 50 to 58, wherein the substrate is comprised in an electrochromic device.
60. A device comprising an electrochromic layer comprising the 2D MOF of any one of paragraphs 1 to 20.
61. The device according to paragraph 60, wherein the device comprises a plurality of pixels, each pixel including the 2D MOF.
62. The device according to paragraph 60 or 61, wherein the 2D MOF are deposited on a substrate.
63. The device according to paragraph 62, wherein the substrate is a semiconductor, quartz, polycrystalline silicon, silicon nitride, silicon oxy-nitride, crystalline silicon, glass, indium tin oxide (ITO), boron nitride (BN), diamond, a polymer, polyethylene terephthalate (PET), flexible material, a conductive material, a metal, graphite or graphene.
64. The device according to paragraph 62 or 63, wherein the 2D MOF form a film covering an area between 1 mm$^2$ and 10 m$^2$.
65. The device according to any one of paragraphs 60 to 64, wherein;
the 2D MOF are positioned between a first electrode and a second electrode, and the first electrode, the second electrode and the 2D MOF are immersed in an electrolyte, and
the 2D MOF is in electrical contact with the first electrode, and the 2D MOF is in ion current contact with the second electrode.
66. The device according to paragraph 65, wherein the first electrode and second electrode provide at least 3 different voltages to the 2D MOF, each corresponding to an oxidation state of the single crystals, and each oxidation state corresponding to a different UV-Vis absorption spectrum of the single crystals.
67. The device according to paragraph 65 or 66, further comprising a conductive layer in contact with the first electrode, and the single crystals in contact with the conductive layer.
68. The device according to any one of paragraphs 65 to 67, further comprising an ion storage layer in contact with the second electrode, the ion storage layer in contact with the electrolyte.
69. The device according to any one of paragraphs 60 to 68, wherein the device is a smart window.
70. The device according to any one of paragraphs 60 to 68, wherein the device is a flexible display device.

The embodiments will be more readily understood by reference to the following examples, which are included merely for purposes of illustration of certain aspects and embodiments of the present invention, and should not be construed as limiting. As such, it will be readily apparent that any of the disclosed specific constructs and experimental plan can be substituted within the scope of the present disclosure.

EXAMPLES

Introduction

In a typical EC device, EC layer and electrolyte layer are sandwiched between a pair of transparent conductive electrodes to form a laminated configuration as shown by prior art FIG. 1. The core part of the device is the EC layer which changes its optical property under electrical voltages in a continual but reversible manner. Seeking proper EC materials is a key to render such technology the required performance, such as flexibility, stability, full coloration, and fast response. Prior to this disclosure, there were two types of chronotropic layers reported for the flexible EC devices. One is based on the organic small molecules and polymer materials (e.g. viologens and polypyrrole). These materials show some advantages in flexibility and polychrome, but they have inherent stability deficiencies to the light and heat in environment. Moreover, the contact between the material and the electrode is weak and the material is easy to collapse and degrade when the driving voltage is too high. These factors shorten the working lifetime of the device ultimately, which greatly limits its practical application in flexible intelligent coloration. The other one is based on inorganic crystal material, such as transition metal oxides (e.g. $WO_3$ and NiO). These show excellent environmental and electrochemical stability, but the brittleness, slow response speed and less variety of color changes limit its application. This is mainly due to the compact crystal structure of transition metal oxides slows the process for ion insertion and detachment, which also results in the need for higher energy to overcome the steric hindrance. Also, the limited oxidation states of the inorganic materials result in single color change (usually from transparent to opaque).

As noted previously, MOFs show some promise for use in electrochromic device. However, these materials are brittle and unsuitable for forming flexible devices. To solve this problem, 2D MOFs are potential candidates to bring flexibility to the EC devices. Moreover, to enrich the color for the EC device, a comprehensive investigation on the organic ligand is necessary to determine the optical properties of the MOFs. Since the year of 2005, many methods have been developed to synthesize MOFs, including 2D MOFs. A challenging goal in the field is the large-scale synthesis of ultra-long range ordered MOF crystals. Nevertheless, until this description, the produced 2D MOFs are either small in lateral size (usually <1 μm) or relatively thick (usually multilayer) or both.

The 2D MOFs described herein address these limitations in synthetic methods to produce 2D MOFs with high aspect ratios. The methods provide 2D MOFs suitable for use in EC devices.

Synthesis and Morphology Control of Layered $Ni(OH)_2$ Precursor.

Synthesis of the layered $Ni(OH)_2$ precursor is an initial step for the preparation of the herein described 2D MOFs. The lateral size and crystallinity of the targeted Ni-based 2D MOFs is dependent on that of the $Ni(OH)_2$ precursor.

Figure 2B:
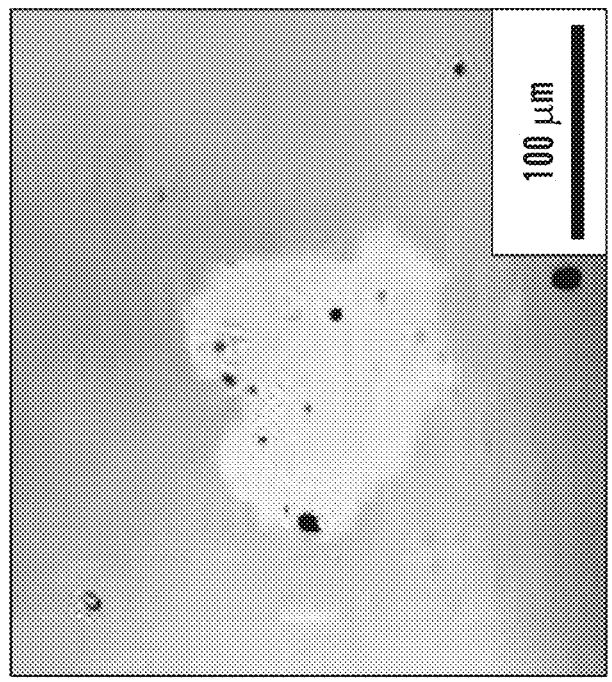
FIG. 2B is an optical image of a metal hydroxide flake after drop casting on a substrate, according to some implementations.
Figure 2A:
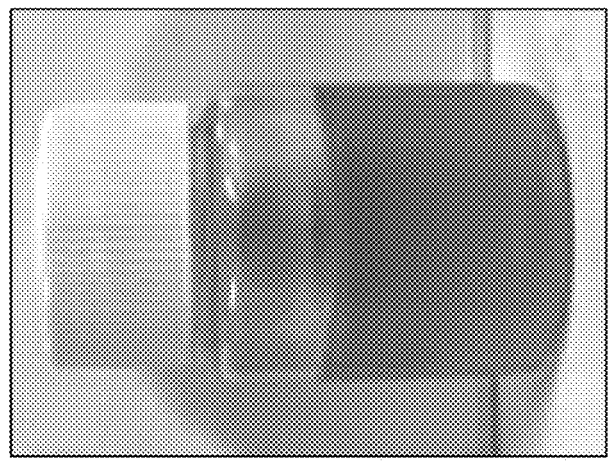
FIG. 2A shows a picture of a vial containing a metal hydroxide nanosheet in solution, according to some implementations.

A modified surfactant-assisted method to synthesize α-Ni$(OH)_2$ nanosheets was used. $Ni(NO_3)_2$ precursor and surfactant hexamethylenetetramine were mixed to react and form α-$Ni(OH)_2$ under a constant temperature. It was found that ultrathin $Ni(OH)_2$ flakes with an area over 10 000 μm$^2$ were obtained at 80 degrees Celsius after 24 hours. FIG. 2A shows a typical picture of the $Ni(OH)_2$ flakes in solution and FIG. 2B a typical optical image of a single $Ni(OH)_2$ flake after drop-casting on a $SiO_2$/Si substrate. The chemical composition and structure were confirmed using Raman spectroscopy and powder XRD (FIG. 3E, 3F), which matched with data in the literature. $Ni(OH)_2$ having the large domains as provided by the herein disclosed methods have never been reported in literature. Some important factors influencing the quality and morphology of the obtained $Ni(OH)_2$ flakes, are surface active additives, pH, temperature, and solvent polarity. In addition to the power XRD and Raman spectroscopy, X-ray photoelectron spectroscopy (XPS), electron dispersive spectroscopy (EDS) can be used to characterize the basic structure and chemical composition. The $Ni(OH)_2$ flakes can be drop cast on a $SiO_2$/Si substrate and the thickness and surface morphology can be characterized using AFM. The $Ni(OH)_2$ flakes can be transferred to a TEM grid, to characterize the crystallinity and defect level using TEM.

Conversion from $Ni(OH)_2$ to High-Quality Ni-BDC 2D MOF and its Characterization Taking the large domains of $Ni(OH)_2$ synthesized as described in the previous section as the precursor, the chemical reaction with $H_2BDC$ in DMSO/ethanol solution was used to synthesize Ni-BDC 2D MOF. Ni-BDC 2D MOF as large as 100 μm$^2$ were obtained after 24 hours at 80 degrees Celsius (FIG. 3A). From the optical contrast and AFM results, the thickness of the 2D MOF was shown to be very uniform. TEM characterization further shows the 2D feature of the 2D MOF (FIG. 3B). The obvious diffraction pattern from the 2D MOF shows the single-crystal nature of the obtained Ni-BDC sheet (FIG. 3B). AFM characterization further shows that the surface of the Ni-BDC 2D MOF is very smooth and the thickness is around 3.5 nm (FIG. 3C, 3D), corresponding to a bilayer Ni-BDC MOF. Comparing the XRD and Raman spectra of the $Ni(OH)_2$ and as-prepared Ni-BDC, the distinct peaks suggested that a new crystal formed (FIG. 3E, 3F). A detailed investigation on the peak assignments indicated Ni-BDC MOFs are obtained. The match of experimental and simulated XRD results further confirmed the acquisition of a Ni-BDC 2D MOF.

Figure 4:
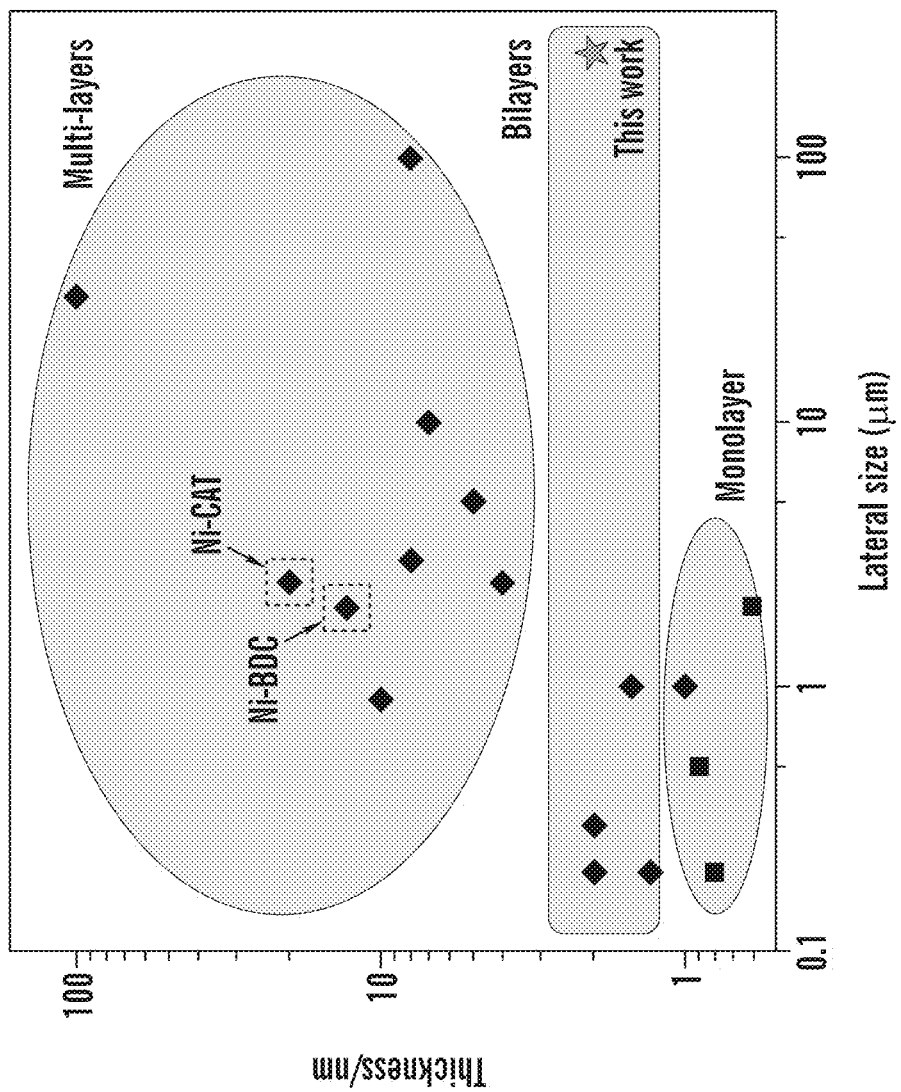
FIG. 4 is a comparison of the thickness and area of the 2D MOFs, according to some implementations, and prior art 2D MOFs.

Large single crystalline domains of Ni-BDC 2D MOF have never been reported in the literature, which is ascribed to the large domain size of $Ni(OH)_2$ precursor prepared as herein described. For example, other methods reported in literature to synthesize a variety of 2D MOFs, often provide MOF nanosheets around 1 μm$^2$ or smaller size and many of them are more than 5 nm thick, the herein described methods provides much larger domains and thinner 2D MOFs (FIG. 4). More importantly, with the 2D MOFs that were synthesized, EC devices on a single 2D MOF crystal can be fabricated to explore and demonstrate the 2D MOFs in electronics. Additionally, the solution-based process offers scale up of the production of the 2D MOFs. Combining with the existing flake assembly technique, a wafer-scale continuous film is expected, allowing the manufacture of multi-pixel EC devices.

Figure 5B:
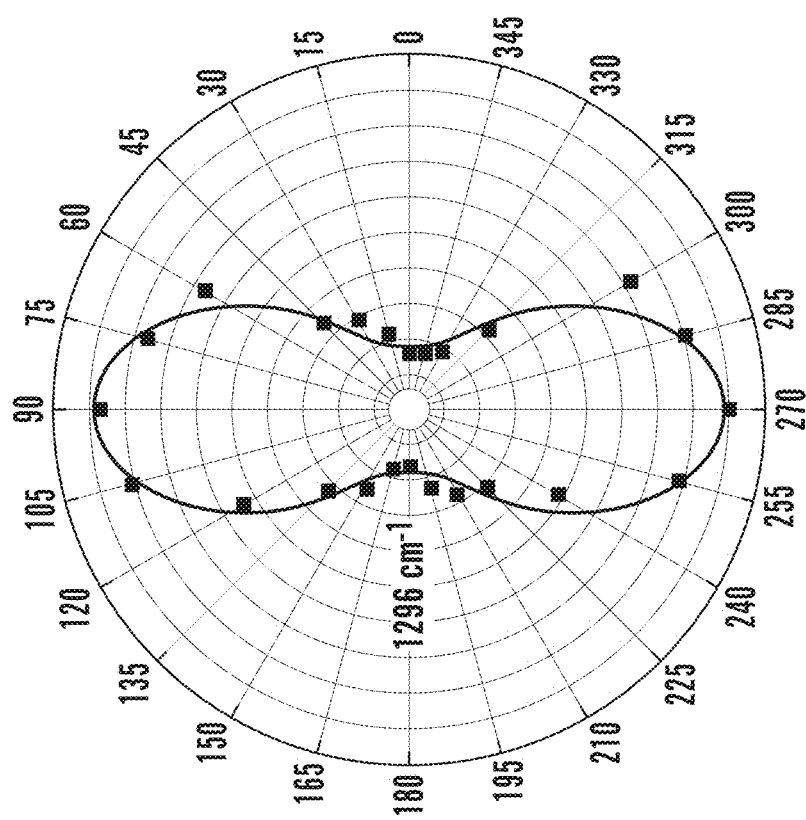
FIG. 5B shows a polar plot of the Raman intensity of 1296 cm$^{-1}$ mode as a function of the angle for the 2D MOF of FIG. 5A.
Figure 5A:
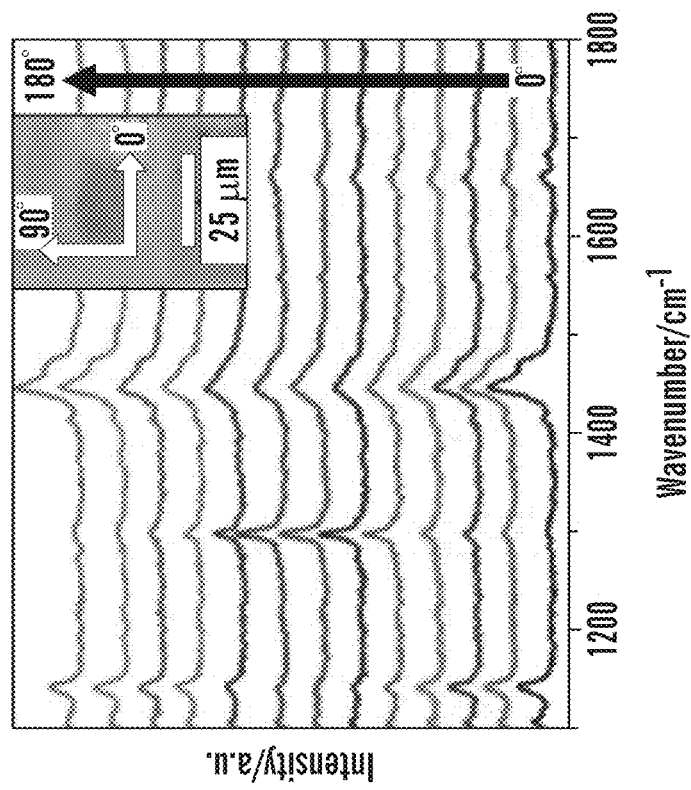
FIG. 5A shows an angle-resolved Raman spectra of a 2D MOF, according to some implementations.

Examination of the shape of each 2D MOF under optical microscope (FIG. 3A) shows most of them are in nearly rectangular shape. This matches the proposed crystal growth theory that the crystal tends to form regular and sharp edges because of the directional growth. Angle-dependent polarized Raman spectroscopy measurements were also performed on a single 2D MOF. As shown in FIG. 5A, the Raman signals from Ni-BDC 2D MOF changed periodically (the measurement was carried out under a backscattering and parallel configuration). This change is responsive to the rotation of the sample, which changes the angle between the polarization direction of the incident laser and the crystal orientation. FIG. 5B shows the polar plot of a Raman mode at 1296 cm$^1$, where the pattern displays a two-fold symmetry, matching with the character of an $A_g$ mode. Such angle-resolved Raman spectra is additional evidence of the single-crystal nature of the synthesized Ni-BDC 2D MOF. This also suggests the anisotropic property of the crystal. Such phenomenon has been widely reported in many inorganic 2D materials (e.g. black phosphorus, GaTe, and ReSe$_2$), but this is the first observation in 2D MOFs. The anisotropy of Ni-BDC 2D MOF offers another dimension through which the properties can be tuned.

Proposed Mechanism

Figure 6:
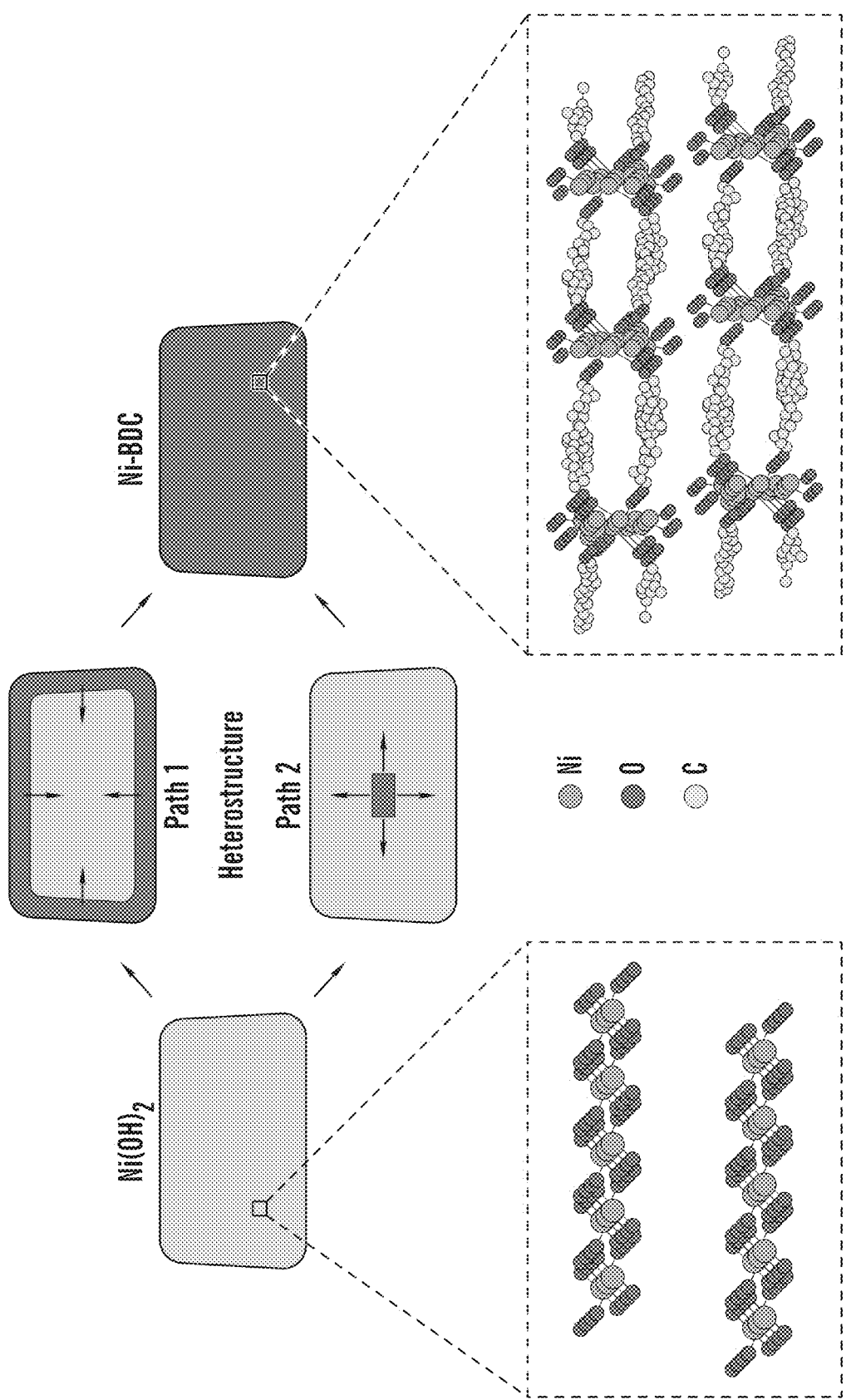
FIG. 6 shows proposed synthetic pathways to obtain the 2D MOFs, according to some implementations.

The morphology of MOF nanosheets is a key proposed factor for their EC performance in terms of the mechanical flexibility and ion transport efficiency. To understand how the structure converts from $Ni(OH)_2$ to Ni-BDC 2D MOF, their crystal structures were carefully examined. As shown in FIG. 6, these crystal structures are very distinct from each other. The $Ni(OH)_2$ crystal belongs to the $D_{3d}$ point group, and there is one layer of Ni atoms in each layer of the $Ni(OH)_2$ crystal. For the layered structure of Ni-BDC 2D MOF, there are three layers of Ni atoms, where each Ni atom is octahedrally coordinated with six 0 atoms from both the BDC ligands and hydroxyls. These Ni-based pseudo octahedrons are further connected with each other in the (200) plane through the BDC ligands, forming the metal coordination layers. Based on the crystal structures, a hypothesis on the chemical reactions during the conversion is represented by steps 1 to 3:

$$H_2BDC(l) \leftrightarrows 2H^+(l) + BDC^{2-}(l); \quad (1)$$

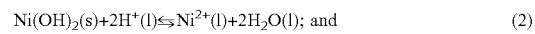

$$Ni(OH)_2(s) + 2H^+(l) \leftrightarrows Ni^{2+}(l) + 2H_2O(l); \text{ and} \quad (2)$$

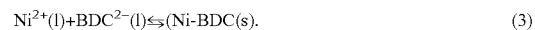

$$Ni^{2+}(l) + BDC^{2-}(l) \leftrightarrows (Ni\text{-}BDC(s)). \quad (3)$$

Figure 7A:
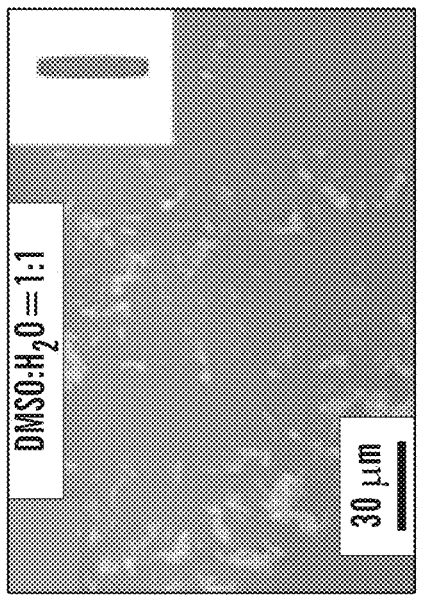
FIG. 7A-7D are optical images of 2D MOFs obtained under different DMSO/H$_2$O ratios. The ratios are.
Figure 7B:
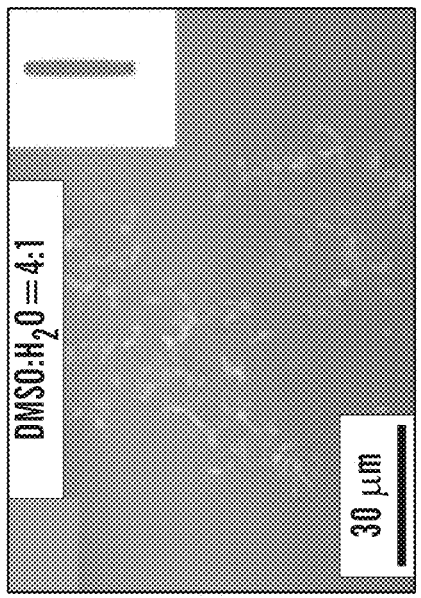
Figure 7C:
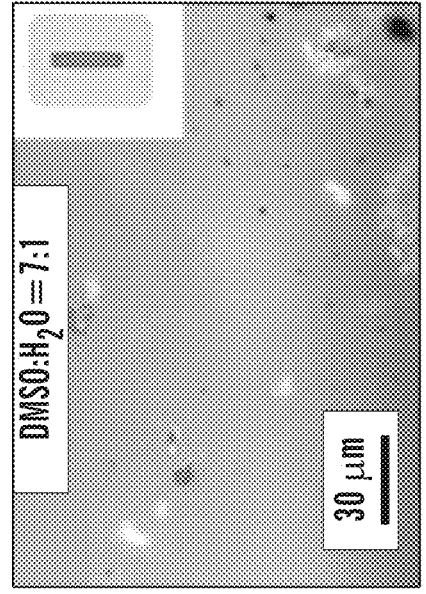
Figure 7D:
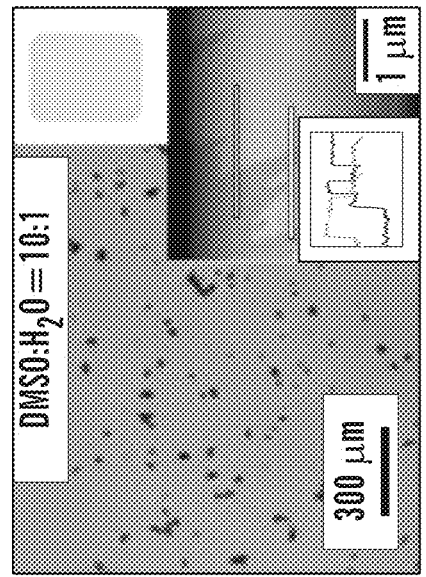

To form large domain size Ni-BDC sheets, the relative reaction rate of step (2) to produce Ni$^+$ and step (3) to form Ni-BDC is proposed as the key. The results show that the ratio of $H_2O$ in the solvent (i.e. DMSO) may be important role in controlling the morphology of the Ni-BDC. When the DMSO:$H_2O$ ratio is low, the obtained Ni-BDC is rod shaped; while when the ratio is high, Ni-BDC ultrathin sheets (~2 nm thick and hundreds of micrometers large) are obtained. FIG. 7A-7D are optical images of 2D MOFs obtained under different DMSO/$H_2O$ ratios; FIG. 7A 1:1; FIG. 7B 4:1; FIG. 7C 7:1; and FIG. 7D 10:1, where the AFM image and height profile of are shown in the inset, and the dark particles on the surface in are unreacted precursors which can be reduced by washing multiple times. The upper right insets are illustrations of the shape of the 2D MOFs.

One proposed growth mechanism, path 1 (FIG. 6), is Ni-BDC seed formation in the middle of the $Ni(OH)_2$ flake, followed by outward growth to form the single crystal Ni-BDC. A second proposed growth mechanism path 2 (FIG. 6), is conversion starting from the edge of the $Ni(OH)_2$ flake and inward growth of Ni-BDC. Path 1 provides the intermediate state $Ni(OH)_2$ @Ni-BDC core-shell structure. Path 2, provides the intermediate state e Ni-BDC @ $Ni(OH)_2$ core-shell structure. These intermediates can be characterized by sampling the solution at different stages of the reaction. The materials can be examined at each stage using TEM and EDS mapping. Alternatively or additional, the in situ conversion from $Ni(OH)_2$ to Ni-BDC on a solid-state surface can be performed. This can be accomplished, for example, by drop-casting the $Ni(OH)_2$ flakes on a silicon substrate, and immersing the substrate supported flakes into a solution of $H_2BDC$ ligand for the conversion. A difference in optical contrast from the converted part and the original part of the $Ni(OH)_2$ flake, due to the difference in dielectric property of the two materials, can be seen. The thickness of the flake before and after conversion can be observed using AFM, and comparison of these results with the theoretical values obtained from the crystal structures of $Ni(OH)_2$ and Ni-BDC can be made. In both studies, the fine structure at the junction of $Ni(OH)_2$ and Ni-BDC can be characterized using atomic resolution TEM. Moreover, an evolutionary change from $Ni(OH)_2$ to Ni-BDC can be summarized. The conversion rate can be calculated based on the relationship between the coverage of Ni-BDC in the flake and the reaction time.

Other 2-D MOFs

Similar to the methodology for the $Ni(OH)_2$ to Ni-BDC conversion, other 2D MOFs can be made. One of the greatest advantages of 2D MOFs as EC layers is that their properties can be tuned through a simple change of the ligand. There are currently more than 30 kinds of ligands known to form 2D MOFs with various metal centers. For example, replacing BDC ligand with CAT and HAB ligands to provide Ni-CAT and Ni-HAB 2D MOFs (FIG. 8A. 8B). Both of these show larger conjugate structure and richer redox sites which are the key for multicolored EC responses.

Figure 8D:
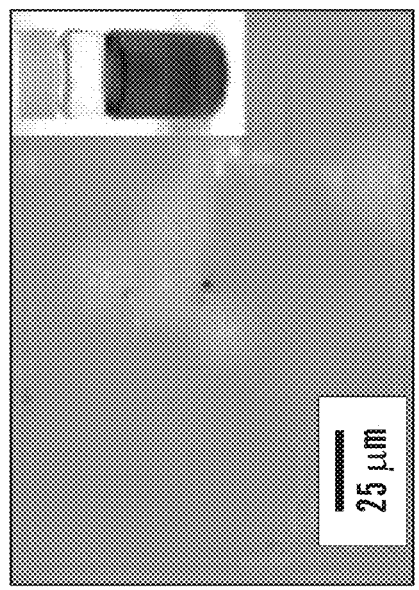
Figure 8C:
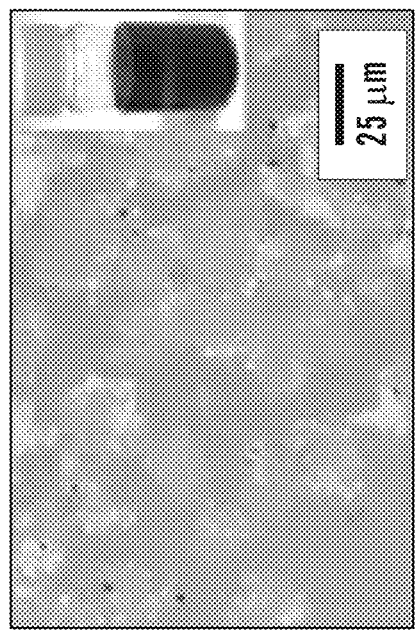

As shown in FIG. 8A, Ni-CAT is a type of layered 2D MOF with graphene-like honeycomb grids. Strong 7-7 interaction exist between layers due to the conjugated structure of the CAT ligand. Theoretical calculation suggests that the bandgap of Ni-CAT is about 0.3 eV. A field-effect hole mobility of 48.6 $cm^2$ $V^{-1}s^{-1}$ has been reported in bulk Ni-CAT, which is comparable to the highest values reported for solution-processed organic or inorganic materials. It is expected that an increased conductivity in the 2D nanosheet can bring significant improvement in EC performance. The Ni-HAB 2D MOF, FIG. 8B, was first reported as a metallic MOF in bulk by a group at MIT. The experimental results show Ni-CAT (FIG. 8C) and Ni-HAB (FIG. 8D) 2D MOF can be made using a strategy similar for the formation of Ni-BDC. As shown in FIG. 8C, the solution changes from apple green to black after the reaction for Ni-CAT 2D MOF. When drop-casting on a Si substrate, micrometer size flakes are observed under optical microscope. At this stage, however, it was also found that the thickness is not as uniform as the Ni-BDC 2D MOF, suggesting that excess nucleation occurs. To avoid this issue, mixed solvent to tune the polarity of the environment can be used. Similar strategies to optimize the reaction condition can be used for improving the quality of Ni-HAB 2D MOF crystals. The characterization methods mentioned for Ni-BDC can also be used to determine the morphology, domain size, structure, phase, thickness, and defects in the Ni-CAT and Ni-HAB 2D MOFs. The formation mechanism can be investigated as previously described.

Optical absorption measurements on the 2D MOF thin films to determine their bandgaps can also be used. A micro-absorption system, enabling absorption measurement on the single flakes of the 2D MOFs, can be used. This also allows measurement of angle-resolved absorption to investigate the optical anisotropy. For direct bandgap semiconducting 2D MOFs, photoluminescence is expected, which can be used to verify the bandgap of these 2D MOFs. This study can demonstrate the diversified structures and properties of 2D MOFs that the conversion method can provide.

Figure 9A:
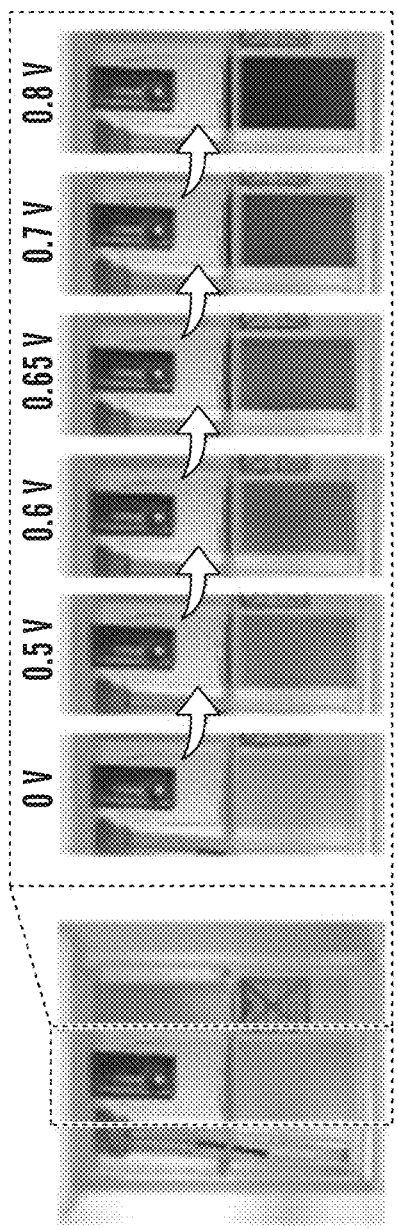
FIG. 9A Illustrates the color change of a MOF ligand under different voltages with Li+/PC as electrolyte, according to some implementations.
Figure 9B:
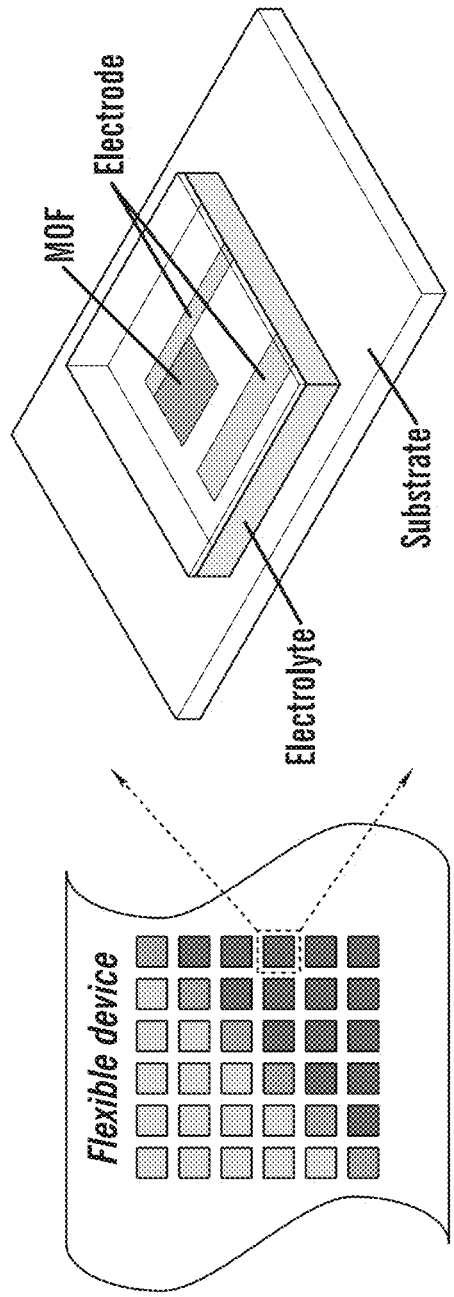
FIG. 9B is a diagram illustrating a liquid-gate EC device with 2D MOF as electrochromic material, according to some implementations.

Fabrication and Benchmark of Reflective Devices Using 2D Ni-Based MOFs as EC Layers The preparation of 2D MOFs single crystals with over 10 000 $\mu m^2$ area allows the fabrication of a pixel device using single flakes implementing current lithography techniques. Results on the CAT-like ligand show useful EC performance (FIG. 9A). Multi-color change was observed with the voltage changing from 0 to 0.8 eV. It is expected that similar EC performance can be obtained on the 2D MOFs, such as the Ni-CAT 2D MOF. An ionic liquid gating EC device can be fabricated on a single flake of 2D MOF to intercalate ions into the 2D MOFs through electric field effect (FIG. 9B). Ions are mixed with liquid gels and spin-coated on the 2D MOFs EC devices to provide a liquid gate. The absorption spectra of the 2D MOFs under different voltages can be measured to demonstrate the color change of the flake in the EC device. Electrochemical measurement to identify the redox states in the 2D MOFs can also be performed. To further improve the EC performance (e.g. response speed), the ion transport at the interface of the 2D MOFs and electrolyte is crucial. This is governed by the ion conductivity and diffusion rate. Lithium, sodium, potassium and magnesium ions can be used as electrolytes to tune the performance. For different 2D MOFs, the matching of the radius of the pores and that of the ions, and the effect on EC response can also be examined. The ionic conductivity of the electrolyte can be improved by optimizing the ion concentration. The voltage window of the electrolyte can also be enlarged by optimizing the ion concentration. The type and proportion of organic solvents (propylene carbonate, dimethylformamide and dimethyl carbonate, etc.) can also be modified to improve the performance.

A pixel array of EC devices can be fabricated. Each pixel is a device based on a single flake of 2D MOFs FIG. 9B. The Marangoni 2D sheets assembly technique for wafer-scale thin film and the micro-fabrication techniques can be implemented to make the EC arrays. By adding different voltages to each pixel, different colors can be displayed on different pixels, demonstrating a multi-color reflective display prototype.

Some Exemplary Bidentate Ligands

Figure 10:
Figure 10:
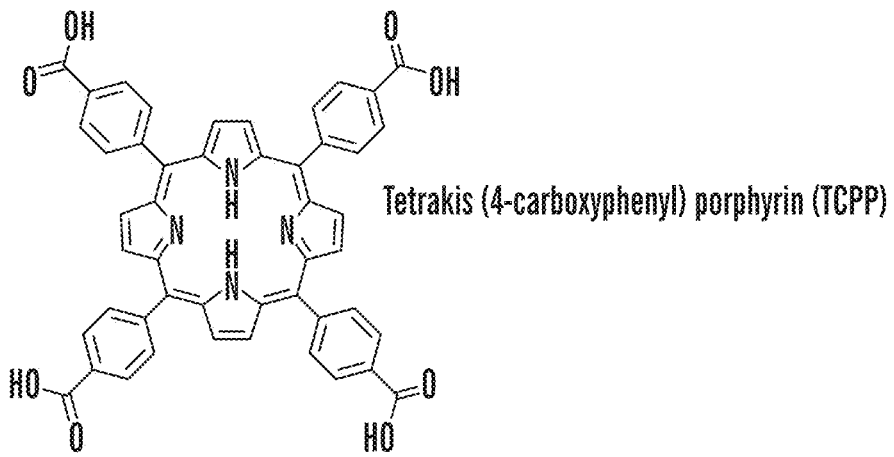
Figure 10:
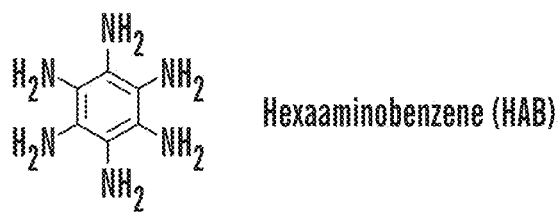
Figure 10:
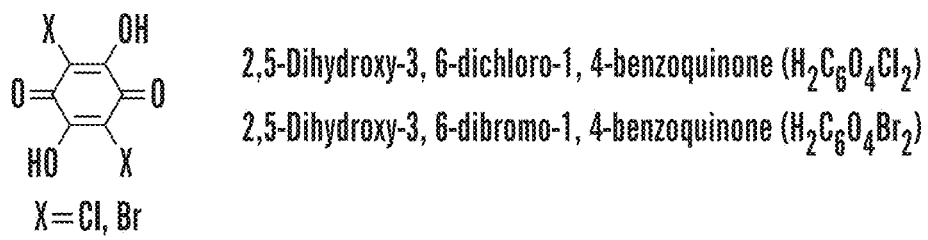
Figure 10:
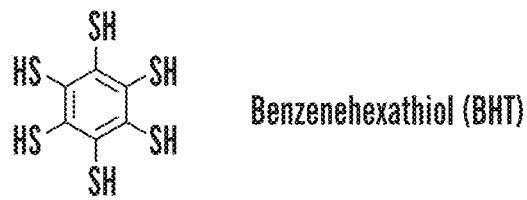
Figure 10:
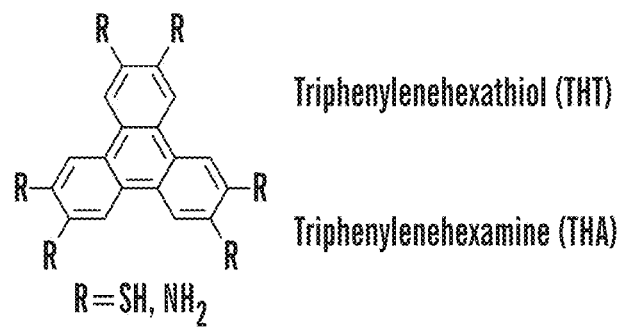

FIG. 10 shows the structures of multidentate ligands according to some implementations as previously described.

Addition Characterization of Some 2D MOFs

Ni-CAT 2D MOF, constructed by CAT ligand and Ni ion, possess a graphene alike honeycomb lattice and the diameter of the honeycomb can reach 2 nm, thus enable a high $Li^+$ transmission efficiency. Meanwhile, due to the high conjugated structure of CAT ligand itself, there is a strong interaction between the Ni-CAT layers, which is also conducive to electron transmission. There structural characteristics allow for a high electrochromic efficiency.

Figure 11A:
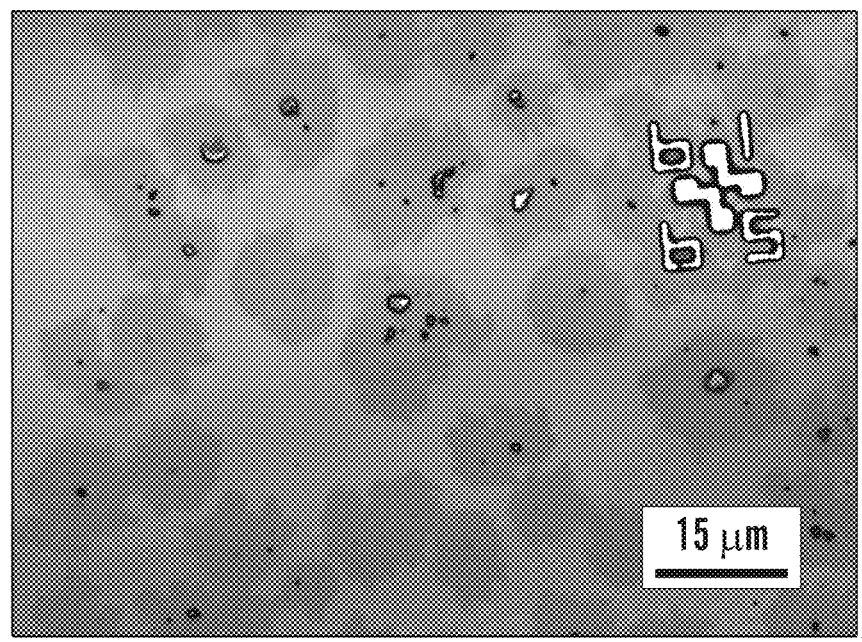
FIG. 11A is a magnified optical image of a 2D MOF, according to some implementations.
Figure 11B:
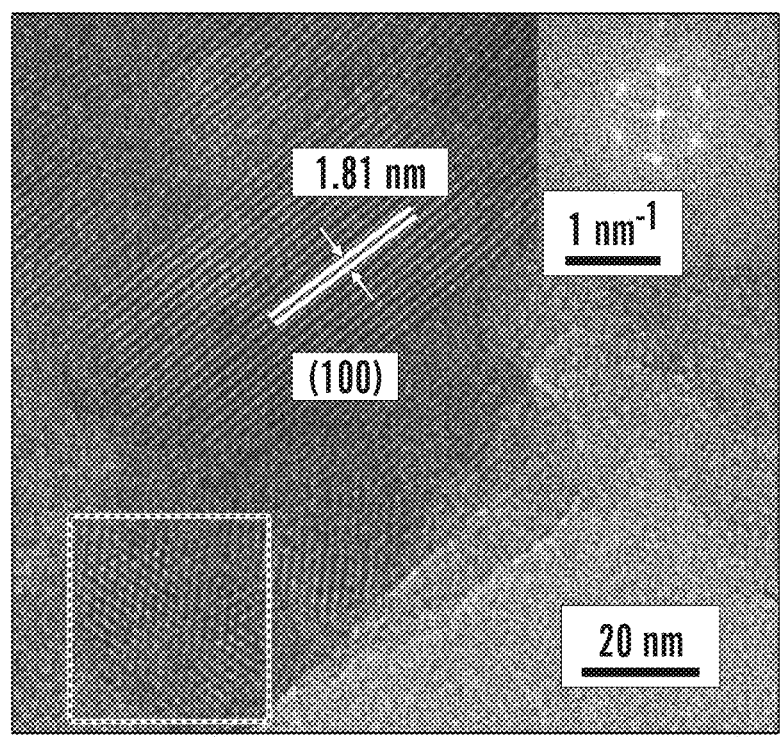
FIG. 11B shows a high resolution TEM image of the 2D MOF of FIG. 11A.

The large domain size and crystal structure of Ni-CAT is illustrated in FIGS. 11A and 11B. FIG. 11A is a magnified optical image of the Ni-CAT 2D MOF. The optical image shows the size of domain is about 20 μm. The size distribution is also narrow. FIG. 11B shows a high resolution TEM image of the Ni-CAT 2D MOF. The well-ordered lines are consistent with the Ni-CAT having a high crystallinity. Inter layer (100) dimensions of 1.81 nm are indicated. An upper right inset FFT also illustrates the crystal structure.

Figure 12:
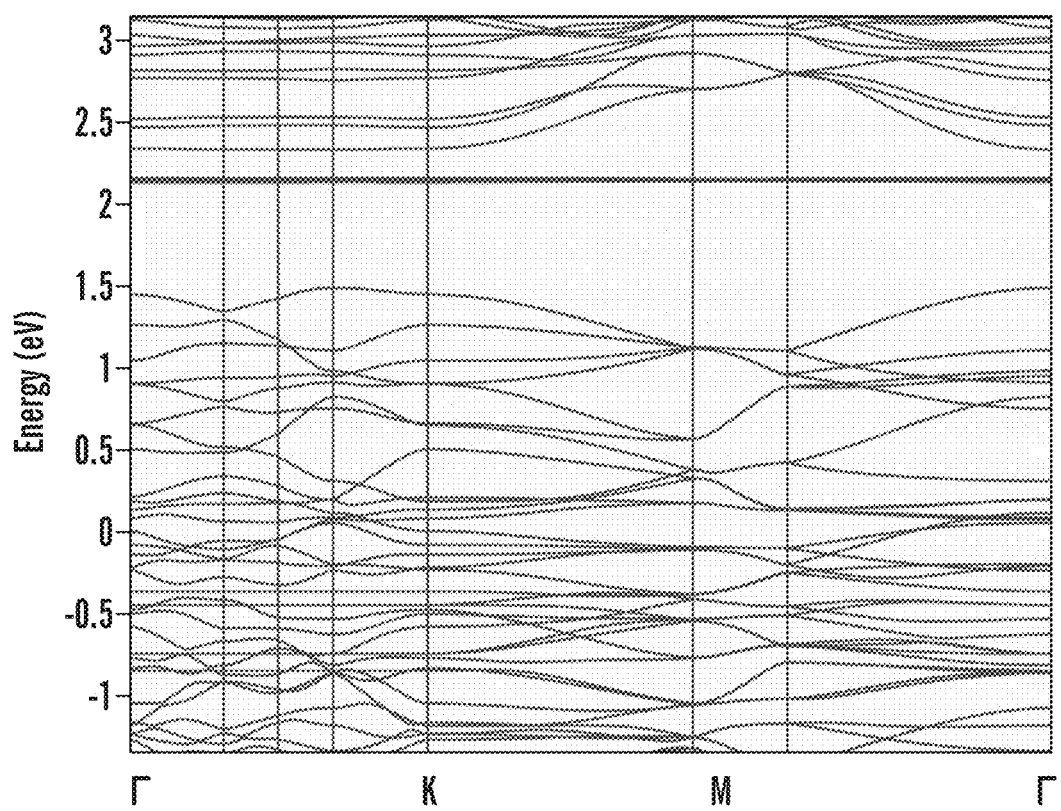
FIG. 12 shows the calculated band structure of the 2D MOF of FIG. 11A.

In addition to the crystalline structure, the electronic structure of the Ni-CAT 2D MOF was explored by calculation. The Band structures of Ni-CAT derived from hybrid Heyd-Scuseria-Ernzerh solution is displayed in FIG. 12. The calculated bandgap is about 0.17 eV, indicating Ni-CAT is in the range of metalloid low bandgap materials. The conductivity of a material is inversely proportional to its bandgap, which also supports the view that the low bandgap of Ni-CAT will give high conductivity. According to the conductivity Formula I, the conductivity of a material is inversely proportional to its bandgap, which also proves the low bandgap of Ni-CAT provides high conductivity.

$$\sigma = KT^{\frac{3}{2}}(\mu_n + \mu_p)e^{-Eg/2KT} \qquad \text{Formula I}$$

Where: K is the Boltzmann constant; T is the temperature; $E_g$ is the bandgap; and n and p is the mobility of electrons and holes, respectively.

Figure 13:
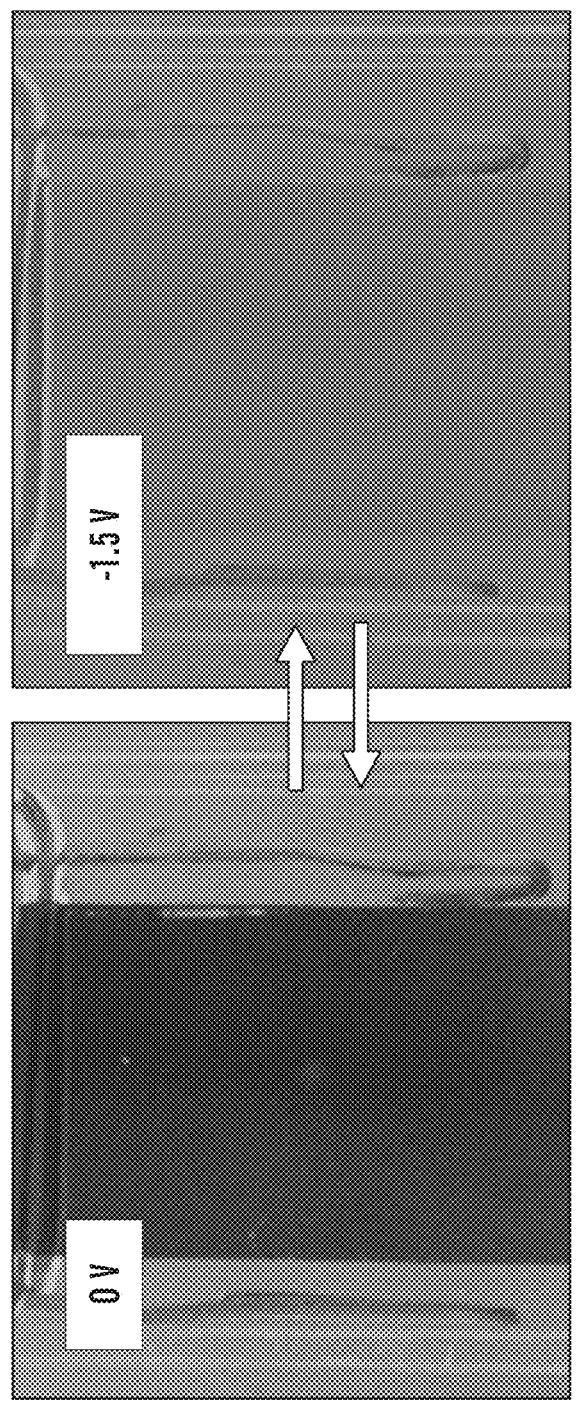
FIG. 13 is a picture of the 2D MOF of FIG. 11A in the colored state on the left, and in the bleach state on the right.

FIG. 13 is a picture of the Ni-CAT film in the colored state on the left (no bias), and the bleached state on the right (biased at −1.5 V). The continuous Ni-CAT nanosheets membrane was prepared and a flexible electrochromic electrode was obtained by transferring the membrane to an ITO/PET base. As shown in the photos, the original color of electrode is dark blue. After the electrode was immersed into electrolyte (1M $LiClO_4$/PC), and subjected to a negative bias, the color of electrode became less intense and more "bleached" with the increasing bias. The electrode gradually turned transparent with increasing negative voltage bias. This optical transmittance change caused by negative potential is related to the electrochemical reduction of CAT ligand. In contrast to the electrochromic phenomena of other MOF based EC material, which often exhibit a transparent state prior to being subjected to a voltage bias, the Ni-CAT 2D MOF exhibits a darkening or increased intensity and color change in the un-biased state. The electrochromic properties of Ni-CAT are hitherto unknown.

Figure 14:
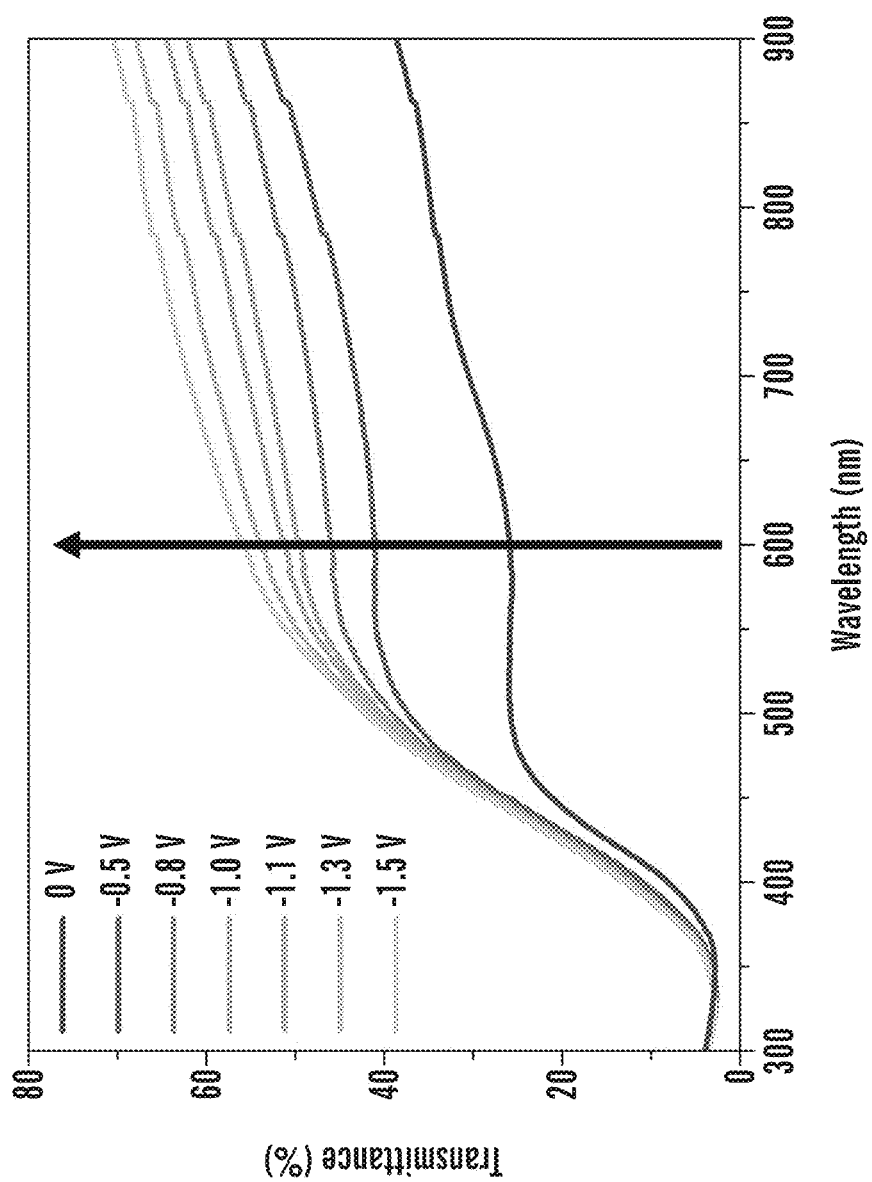
FIG. 14 shows optical transmittance spectra at different voltages, for the 2D MOF shown in FIG. 11A.

The optical transmittance spectra of Ni-CAT 2D MOF is shown in FIG. 14 for a series of voltages between 0 V and −1.5 V. As shown, the transmittance increases with the increasing negative bias. The optical modulation range of electrochromic materials, ΔT, is defined as the transmittance difference between the original and colored status. This reaches 42% at the −1.5 V bias and at 600 nm (indicated by the arrow in FIG. 13).

Figure 15:
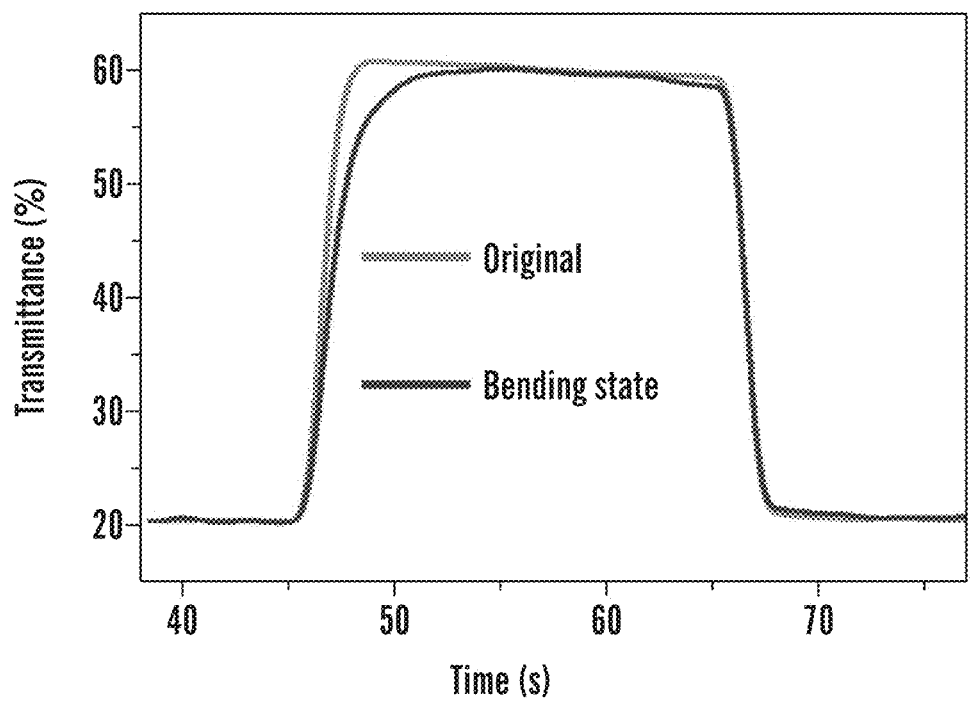
FIG. 15 is a plot illustrating switching between the colored state and uncolored, for the 2D MOF shown in FIG. 11A.

FIG. 15 is a plot illustrating switching time between the colored state and uncolored or bleached state for the Ni-CAT 2D MOF. The transmittance was monitored with the Ni-CAT 2D MOF in a relaxed (original-unbent state) and in a bent state. The transmittance (%) was monitored at 660 nm. At 30 secs, the voltage was turned to −1.5 V from 0 V and maintained until about 50 seconds (for both relaxed and in the bent state). The coloration and bleaching time is the time to achieve 90% of the full coloration (full coloration is about 58-60% transmittance). This was about 1.2 sec for the relaxed state, and about 2.4 sec for the bent state. The response times for both is short and bending does not cause an increase that would cause a response attenuation issue.

Figure 16:
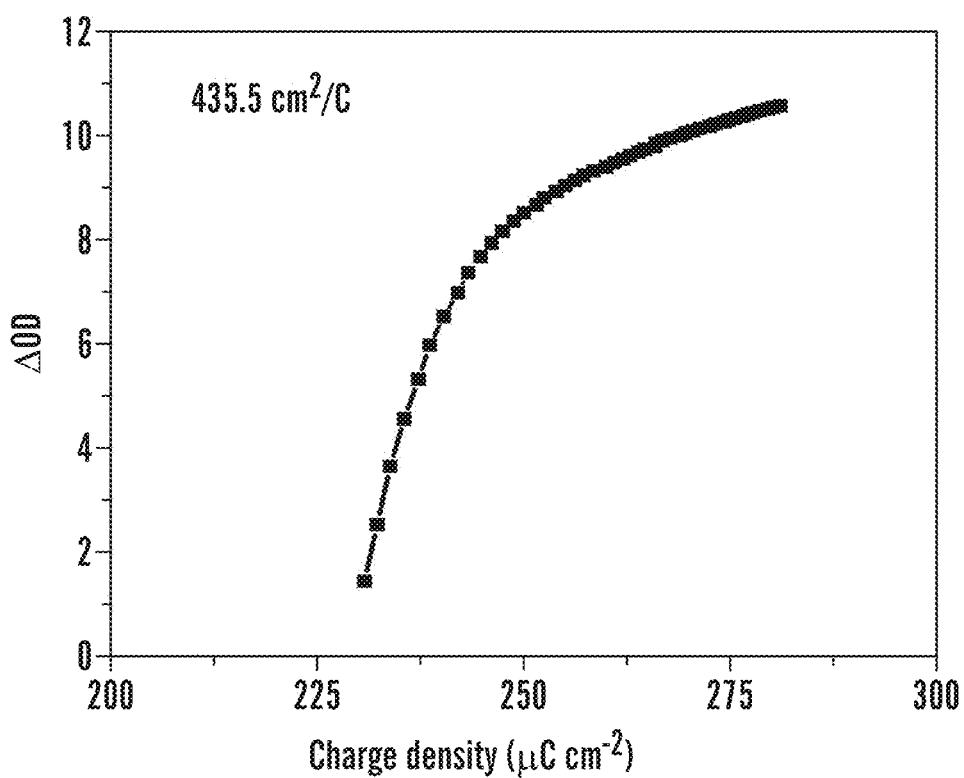
FIG. 16 is a plot optical density change (AOD) as a function of the injected charge density, for a 2D MOF of FIG. 11A.

FIG. 16 is a plot of optical density change (AOD) as a function of the injected charge density for the Ni-CAT 2D MOF electrode. The quantify the efficiency of the optical density changes in the 2D MOFs with respect to the input charges, the coloration efficiency (CE) is measured. The CE indicates how efficiently the material can use the injected charges. In the graph, optical density change as a function of the injected charge density in a bleaching process is shown. The calculated CE value is 436 $cm^2/C$. This shows that a large optical change can be achieved using a small amount of charge. Accordingly, the energy consumption is low because of the high CE.

Figure 17:
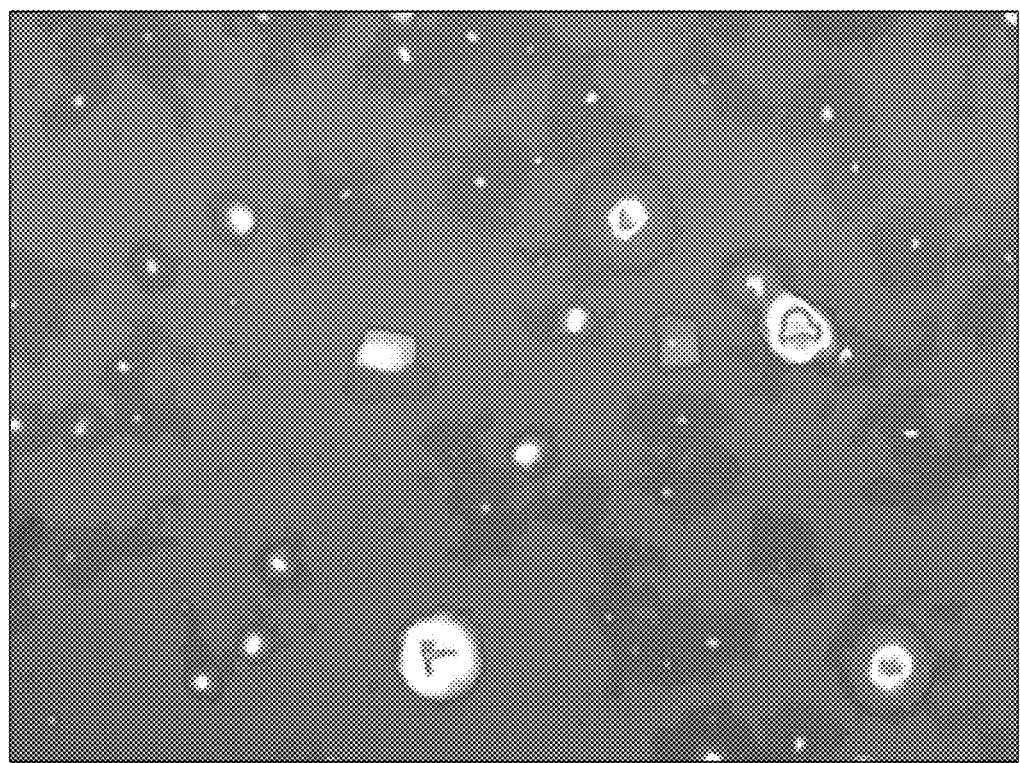
FIG. 17 is a magnified optical image of a 2D MOF, according to some implementations.

FIG. 17 is a magnified optical image of Ni-HAB 2D MOF. The large domain size is illustrated. The size domain of the crystals is about 20 μm. The size distribution is also shown to be narrow. This class of MOFs was synthesized from the same pathway as Ni-CAT 2D MOF and can be electrochromic as well.

Additional Results

The methods provide repeatable synthesis of different types of 2D MOFs with the single crystalline domain size larger than 100 μm and tunable thickness from 5 nm to hundreds of nanometers.

More than four colors (cover red/green/blue tricolors) are expected to obtain on at least one type of 2D MOFs by applying different voltages.

A multi-pixel flexible reflective display based on a 9×9 array of EC devices can be made. The device can maintain excellent discoloration effect (coloring/discoloration time within 5 seconds) and mechanical stability in the process of bending 1000 times. There was no obvious attenuation in 1000 chemical cycles.

REFERENCES

1. S. K. Deb, Appl. Opt., 1969, 8, 192-195.
2. P. M. Beaujuge, S. Ellinger, J. R. Reynolds, Nat. Mater., 2008, 7, 795.
3. W. A. Gazotti, G. C. Miceli, A. Geri, A. Berlin, Adv. Mater., 1998, 10, 1522.
4. E. Hwang, S. Seo, S. Bak, H. Lee, M. Min, H. Lee, Adv. Mater., 2014, 26, 5129.
5. K. Li, Q. Zhang, H. Wang, Y. Li, J. Mate. Chem. C, 2016, 4, 5849.
6. Y. Ren, X. Zhou, H. Zhang, L. Lei, G. Zhao, J. Mater. Chem. C, 2018, 6, 4952.
7. L. Liang, J. Zhang, Y. Zhou, J. Xie, X. Zhang, M. Guan, Y. Xie, Sci. Rep., 2013, 3, 1936.
8. Y. E. Firat, A. Peksoz, Electrochim. Acta, 2019, 295, 645.
9. L. Zhu, W. L. Ong, X. Lu, K. Zeng, H. J. Fan, G. W. Ho, Small, 2017, 13, 1700084.
10. O. M. Yaghi., H. Li, J. Am. Chem. Soc, 1995, 117, 10401.
11. O. M. Yaghi., G. Li, H Li, Nature, 1995, 378, 703.
12. H. Li, M. Eddaoudi, Nature, 1999, 402, 276.
13. W. Xuan, C. Zhu, Liu Y, Chem. Soc. Rev., 2012, 41, 1677.
14. C. R. Wade, M. Li, M. Dincă, Angew. Chem., Int. Edit., 2013, 52, 13377.
15. C. W. Kung, T. C. Wang, J. E. Mondloch, Chem. Mater., 2013, 25, 5012.

16. M. Zhao, Y. Huang, Y. Peng, Z. Huang, Q. Ma, H. Zhang, Chem. Soc. Rev., 2018, 47, 6267.
17. W. M. Liao, J. H. Zhang, S. Y. Yin, H. Lin, X. Zhang, J. Wang, M. Pan, Nat. Commun., 2018, 9, 2401.
18. M. Dae, T. Lee, B. Kim, G. Chae, J. Kim, S. Kim, J. Myoung, and U. Jeong, ACS nano, 2011, 5, 11, 8600.
19. X. Li, T. Yang, Y. Yang, J. Zhu, L. Li, F. Alam, X. Li, K. Wang, H. Cheng, C. Lin, Y. Fang, Adv. Funct. Mater. 2016, 26, 1329.
20. V. Rubio-Giménez, M. Galbiati, J. Castells-Gil, N. Almora-Barrios, J. Navarro-Sánchez, G. Escorcia-Ariza, E. Coronado, Adv. Mater., 2018, 30, 1704291.
21. H. David, L. David, P. Shawn, B. Christina, M. Barry. J. Phys. Chem. C 2012, 116, 6771.
22. Z. Youqi, C. Chuanbao, T. Shi, C. Wangsheng, W. Ziyu, L. Yadong. Sci. Rep. 2014, 4, 5787.
23. S. Yang, X. Wu, C. Chen, H. Dong, W. Hu, X. Wang, Chem. Commun. 2012, 48, 2773.
24. M. Ko, L. Mendecki, A. Mirica, Chem. Commun. 2018, 54, 7873.
25. Y. Tian, Z. Zhang, C. Wu, L. Yan, W. Chen, Z. Su, Phys. Chem. Chem. Phys., 2018. 20, 1821.
26. V. Rubio-Gimenez, M. Galbiati, J. Castells-Gil, N. Almora-Barrios, J. Navarro-Sánchez-, G. Escorcia-Ariza, E. Coronado, Adv. Mater. 2018, 30, 1704291.
27. H. Dou, L. Sun, Y. Ge, W. Li, C. Hendon, J. Li, M. Dincă, J. Am. Chem. Soc. 2017, 139, 13608.
28. M. Zhao et al., Small Methods, 2017, 1600030.
29. P. Falcaro et al., Chem. Soc. Rev., 2014, 43, 5512.

All patents and other publications identified in the specification and examples are expressly incorporated herein by reference for all purposes. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A two-dimensional metal organic framework (2D MOF) comprising:
   a plurality of multivalent metals or metal ions and a plurality of multidentate ligands arranged to form a crystalline structure having a lateral size of at least about 30 µm and a thickness of about 4.5 nm or lower, and
   wherein the crystalline structure is a single crystal.

2. The 2D MOF according to claim 1, wherein the crystalline structure has an aspect ratio of at least 5000.

3. The 2D MOF according to claim 1, wherein the 2D MOF comprises a bilayer structure.

4. The 2D MOF according to claim 1, wherein the 2D MOF has a smooth surface.

5. The 2D MOF according to claim 1, wherein the 2D MOF is anisotropic.

6. The 2D MOF according to claim 1, wherein the 2D MOF has two-fold symmetry, three-fold symmetry, four-fold symmetry or six-fold symmetry.

7. The 2D MOF according to claim 1, wherein the 2D MOF has uniform thickness.

8. The 2D MOF according to claim 1, wherein the multivalent metal or metal ion is a transition metal.

9. The 2D MOF according to claim 8, wherein the transition metal is a first row transition metal.

10. The 2D MOF according to claim 1, wherein the multidentate ligand includes an aromatic core structure and two or more functional groups attached to the periphery of the aromatic core and each functional group capable of forming a bond to the multivalent metal.

11. The MOF according to claim 1, wherein the 2D MOF exhibits two or more oxidation states, and each oxidation state corresponds to a different UV-Vis absorption spectrum for the 2D MOF.

12. A substrate comprising on at least part of a surface of the substrate a 2D MOF of claim 1.

13. The substrate of claim 12, wherein the substrate comprises a material selected from a semiconductor, quartz, polycrystalline silicon, silicon nitride, silicon oxy-nitride, crystalline silicon, glass, indium tin oxide (ITO), boron nitride (BN), diamond, a polymer, polyethylene terephthalate (PET), a conductive material, a metal, graphite or graphene.

14. The substrate of claim 13, wherein the substrate is comprised in an electrochromic device.

15. The substrate of claim 12, wherein the substrate is an electrode.

16. The substrate of claim 12, wherein the substrate is transparent to visible light.

17. The substrate of claim 12, wherein the 2D MOF forms a film on at least a portion of the surface of the substrate.

18. The substrate of claim 17, wherein the film covers an area between 1 $mm^2$ and 10 $m^2$.

19. A method of preparing a 2D MOF of claim 1, the method comprising;
reacting a metal oxide compound suspended in a liquid with a multidentate ligand dissolved in the liquid,
wherein the reaction occurs while at least a portion of the metal oxide compound is not dissolved in the liquid, and the product 2D MOF is at least partially insoluble in the liquid.

20. The method according to claim 19, wherein the layered metal oxide compound is a crystalline compound formed as a nanosheet having an aspect ratio of at least about 1000, and a surface area on a first side of at least about 5 $\mu m^2$.

21. The method according to claim 19, wherein the layered multivalent metal containing compound is a metal oxide nanosheet.

22. The method according to claim 19, wherein the liquid is a homogeneous mixture including at least a first solvent and a second solvent.

23. The method according to claim 22, wherein the first solvent is an aprotic solvent, and the second solvent is a protic solvent.

24. The method according to claim 23, wherein the molar ratio of the aprotic solvent to the protic solvent is between about 1:10 to 10:1.

25. The method according to claim 22, wherein the first solvent is dimethylsulfoxide (DMSO), dimethylformamide (DMF), acetonitrile, tetrahydrofurane (THF), diethyl ether, an ether, dioxane, a ketone, hexamethylphosphoramide (HMPA), dimethyl-2-imidazolidinone (DMI), or a mixture thereof.

26. The method according to claim 22, wherein the second solvent is water, an organic acid, ammonia, an amine, an alcohol, or a mixture thereof.

27. The method according to claim 19, further comprising heating the liquid to a temperature between about 50 and 180 degrees Celsius.

28. The method according to claim 19, further comprising removing the 2D MOF product from the liquid when it has reacted for a time to provide a planar single crystal having an aspect ratio of at least about 1000 to 1, a surface area on a first side of at least about 5 $\mu m^2$, and a thickness of about 5 nm or less.

29. A method for preparing a metal oxide nanosheet, the method comprising:
mixing a metal containing precursor with a surfactant at a high temperature for a period of time, wherein the produced metal oxide nanosheet has a crystalline structure having a lateral size of at least about 30 $\mu m$ and a thickness of about 4.5 nm or lower, and wherein the crystalline structure is a single crystal.

* * * * *